(12) United States Patent
Johnson et al.

(10) Patent No.: US 12,437,832 B2
(45) Date of Patent: Oct. 7, 2025

(54) REPAIR TECHNIQUES FOR COUPLED MEMORY DIES

(71) Applicant: Micron Technology, Inc., Boise, ID (US)

(72) Inventors: James Brian Johnson, Boise, ID (US); Brent Keeth, Boise, ID (US); Kunal R. Parekh, Boise, ID (US); Eiichi Nakano, Boise, ID (US); Amy Rae Griffin, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 144 days.

(21) Appl. No.: 18/525,403

(22) Filed: Nov. 30, 2023

(65) Prior Publication Data

US 2024/0194287 A1 Jun. 13, 2024

Related U.S. Application Data

(60) Provisional application No. 63/386,695, filed on Dec. 9, 2022.

(51) Int. Cl.
*G11C 29/52* (2006.01)
*G11C 29/02* (2006.01)

(52) U.S. Cl.
CPC ............ *G11C 29/52* (2013.01); *G11C 29/022* (2013.01); *G11C 29/025* (2013.01)

(58) Field of Classification Search
CPC ...... G11C 29/52; G11C 29/022; G11C 29/025
See application file for complete search history.

(56) References Cited

U.S. PATENT DOCUMENTS

2021/0334034 A1* 10/2021 Ryu ...................... G06F 3/0679

* cited by examiner

*Primary Examiner* — Sultana Begum
(74) *Attorney, Agent, or Firm* — Holland & Hart LLP

(57) ABSTRACT

Methods, systems, and devices for repair techniques for coupled host and memory dies are described. For example, to distribute memory access circuitry among multiple semiconductor dies of a stack, a first die may include a set of one or more memory arrays and a first portion of circuitry configured to access the set of memory arrays, and a second die may include a second portion of circuitry configured to access the set of memory arrays. The second portion of the circuitry (e.g., of the second die) may be configured to support various repair techniques for operations with the set of memory arrays, including techniques in response to column failures or serialization failures associated with the first die, or in response to contact or other interconnection failures with or between the first die and the second die, among other techniques that may be differentiated based on an attribution of error conditions.

20 Claims, 11 Drawing Sheets

REPAIR TECHNIQUES FOR COUPLED MEMORY DIES

CROSS REFERENCE

The present Application for Patent claims the benefit of U.S. Provisional Patent Application No. 63/386,695 by JOHNSON et al., entitled "REPAIR TECHNIQUES FOR COUPLED MEMORY DIES," filed Dec. 9, 2022, assigned to the assignee hereof, and expressly incorporated by reference in its entirety herein.

TECHNICAL FIELD

The following relates to one or more systems for memory, including repair techniques for coupled memory dies.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
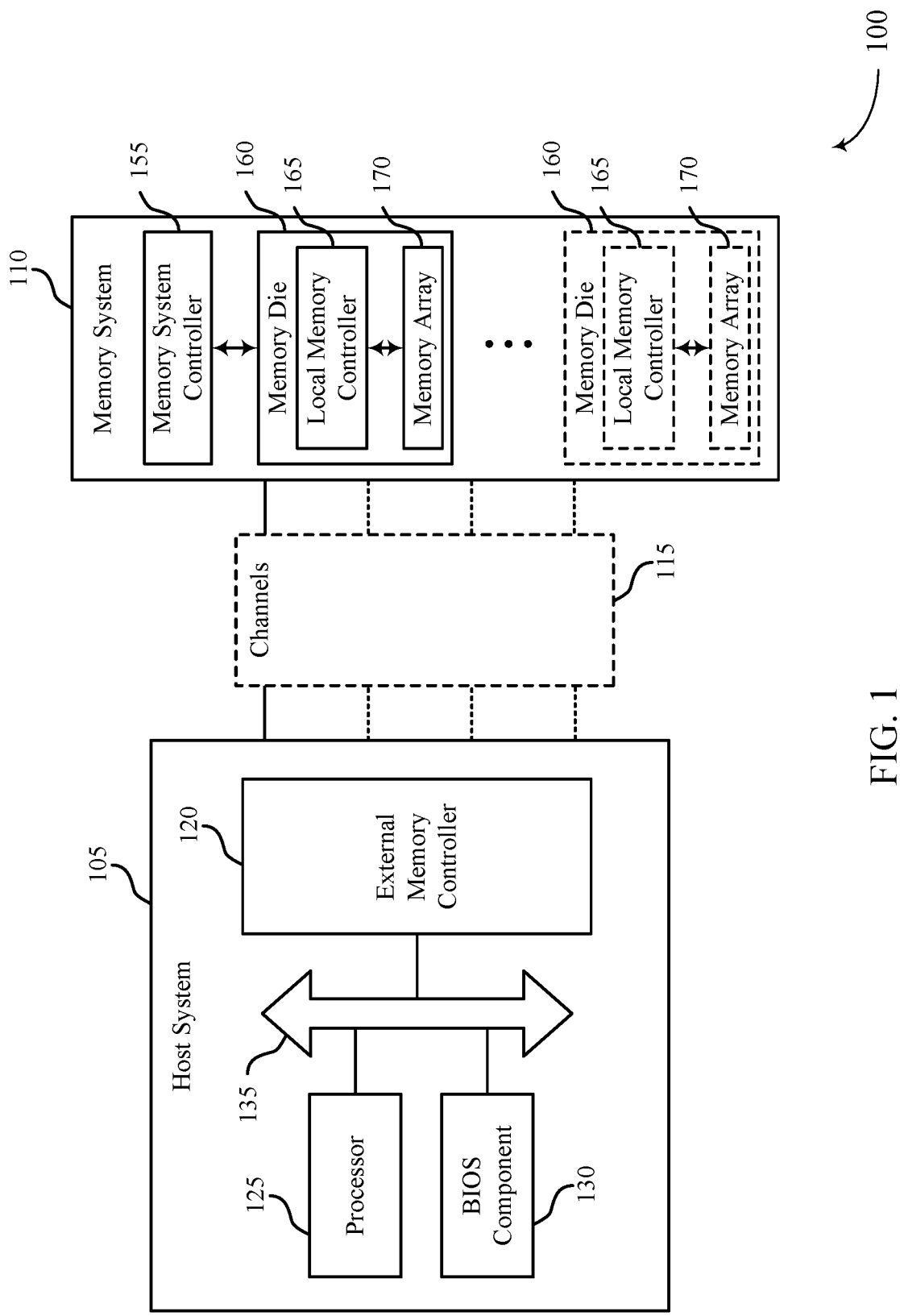
FIG. 1 illustrates an example of a system that supports repair techniques for coupled memory dies in accordance with examples as disclosed herein.

In some memory systems, a memory die may include one or more memory arrays (e.g., one or more arrays of memory cells) and control circuitry configured for accessing the one or more memory array's (e.g., in response to an access command). Such a memory die may include contacts, such as solder pads, that support a communicative coupling between the control circuitry of the memory die and a host (e.g., a host device) that issues commands to access the one or more memory arrays. However, some interconnection techniques for such memory dies may have limitations associated with a quantity of contacts supported for a given die size (e.g., contact density limitations), or with a throughput of information between the control circuitry and a host (e.g., data rate limitations), or with an amount of storage for a given die size (e.g., storage density limitations), among other issues.

In accordance with examples as disclosed herein, a semiconductor system, such as a memory system, may distribute memory access circuitry among multiple semiconductor dies of a stack. For example, a first die may include one or more memory arrays and a first portion of the circuitry configured to access the one or more memory arrays (e.g., a first interface block), and a second die may include a second portion of the circuitry configured to access the one or more memory arrays (e.g., a second interface block). In some examples, the first portion of the access circuitry (e.g., of the first die) may include array decoder circuitry, writing and sensing circuitry, timing circuitry, or synchronization and sequencing logic for accessing the memory arrays, or any combination thereof, whereas the second portion of the access circuitry (e.g., of the second die) may include circuitry to support access operation configurations, repair, interface training, error control (e.g., error detection, error correction), temperature adaptation, adverse access pattern mitigation, or self-test functionality for accessing the memory arrays, or any combination thereof. However, various examples of the described techniques may include other distribution(s) of memory access functionality among circuitry of multiple semiconductor dies.

In some implementations, such a semiconductor system may include an overprovisioning of memory cells and access circuitry (e.g., in one or more first dies), which may support various techniques for repairing failures (e.g., physical failures, logical failures) in the semiconductor system. For example, a first die may include a redundancy portion (e.g., a redundancy array, redundant access circuitry) that may be used to replace a failed portion of other array space, or failed circuitry for accessing a memory array (e.g., of a first portion of access circuitry), or a failed signal path in or between the first die and the second die (e.g., a failed through-silicon via (TSV), a failed interconnection between contacts of respective dies), among other failures. The second die may include circuitry (e.g., in a second portion of access circuitry) that is operable to replace failed array space or associated access circuitry by accessing the redundancy portion of the first array, which may include routing signaling via a different signal path of or between the first die and the second die. Such circuitry of the second die may support configuring a repair solution based on a detected failure, such as allocating an amount of resources from the redundancy portion based on whether the failure is detected to be a column failure (e.g., of an array of the first die), a serialization, deserialization, or other circuitry failure (e.g., of a first portion of access circuitry of the first die), or an interconnection failure (e.g., of or between the first die and the second die), or various other types or granularities of failures. Thus, the described techniques for repairing portions of coupled memory dies may utilize a redundancy portion more efficiently than other techniques, thereby improving a manufacturing yield rate or storage rating for the semiconductor system, among other advantages.

Features of the disclosure are initially illustrated and described in the context of systems with reference to FIG. 1. Features of the disclosure are illustrated and described in the context of a system, interface architectures and implementations, and a flowchart with reference to FIGS. 2 through 11.

FIG. 1 illustrates an example of a system 100 that supports repair techniques for coupled host and memory dies in accordance with examples as disclosed herein. The system 100 may include portions of an electronic device, such as a computing device, a mobile computing device, a wireless communications device, a graphics processing device, a vehicle, or other systems. The system 100 includes a host system 105, a memory system 110, and one or more channels 115 coupling the host system 105 with the memory system 110 (e.g., to provide a communicative coupling). The system 100 may include one or more memory systems 110, but aspects of the one or more memory systems 110 may be described in the context of a single memory system 110.

The host system 105 may be an example of a processor (e.g., circuitry, processing circuitry, a processing component) that uses memory to execute processes, such as a processing system of a computing device, a mobile computing device, a wireless communications device, a graphics processing device, a wearable device, an internet-connected device, a vehicle controller, a system on a chip (SoC), or other stationary or portable electronic device, among other examples. The host system 105 may include one or more of an external memory controller 120, a processor 125, a basic input/output system (BIOS) component 130, or other components (e.g., a peripheral component, an input/output controller, not shown). The components of the host system 105 may be coupled with one another using a bus 135.

An external memory controller 120 may be configured to enable communication of information (e.g., data, commands, control information, configuration information) between components of the system 100 (e.g., between components of the host system 105, such as the processor 125, and the memory system 110). An external memory controller 120 may process (e.g., convert, translate) communications exchanged between the host system 105 and the memory system 110. In some examples, an external memory controller 120, or other component of the system 100, or associated functions described herein, may be implemented by or be part of the processor 125. For example, an external memory controller 120 may be hardware, firmware, or software (e.g., instructions), or some combination thereof implemented by a processor 125 or other component of the system 100 or the host system 105. Although an external memory controller 120 is illustrated outside the memory system 110, in some examples, an external memory controller 120, or its functions described herein, may be implemented by one or more components of a memory system 110 (e.g., a memory system controller 155, a local memory controller 165) or vice versa. In various examples, the host system 105 or an external memory controller 120 may be referred to as a host.

A processor 125 may be operable to provide functionality (e.g., control functionality) for the system 100 or the host system 105. A processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination thereof. In some examples, a processor 125 may be an example of a central processing unit (CPU), a graphics processing unit (GPU), a general purpose GPU (GPGPU), or an SoC, among other examples.

In some examples, the system 100 or the host system 105 may include an input component, an output component, or a combination thereof. Input components may include a sensor, a microphone, a keyboard, another processor (e.g., on a printed circuit board), an interface (e.g., a user interface, an interface between other devices), or a peripheral that interfaces with system 100 via one or more peripheral components, among other examples. Output components may include a display, audio speakers, a printing device, another processor on a printed circuit board, or a peripheral that interfaces with the system 100 via one or more peripheral components, among other examples.

The memory system 110 may be a component of the system 100 that is operable to provide physical memory locations (e.g., addresses) that may be used or referenced by the system 100. The memory system 110 may include a memory system controller 155 and one or more memory dies 160 (e.g., memory chips) to support a capacity for data storage. The memory system 110 may be configurable to work with one or more different types of host systems 105, and may respond to and execute commands provided by the host system 105 (e.g., via an external memory controller 120). For example, the memory system 110 (e.g., a memory system controller 155) may receive a write command indicating that the memory system 110 is to store data received from the host system 105, or receive a read command indicating that the memory system 110 is to provide data stored in a memory die 160 to the host system 105, or receive a refresh command indicating that the memory system 110 is to refresh data stored in a memory die 160, among other types of commands and operations.

A memory system controller 155 may include components (e.g., circuitry, logic) operable to control operations of the memory system 110. A memory system controller 155 may include hardware, firmware, or instructions that enable the memory system 110 to perform various operations, and may be operable to receive, transmit, or execute commands, data, or control information related to operations of the memory system 110. A memory system controller 155 may be operable to communicate with one or more of an external memory controller 120, one or more memory dies 160, or a processor 125. In some examples, a memory system controller 155 may control operations of the memory system 110 in cooperation with a local memory controller 165 of a memory die 160.

Each memory die 160 may include a local memory controller 165 and a memory array 170. A memory array 170 may be a collection of memory cells, with each memory cell being operable to store one or more bits of data. A memory die 160 may include a two-dimensional (2D) array of memory cells, or a three-dimensional (3D) array of memory cells. In some examples, a 2D memory die 160 may include a single memory array 170. In some examples, a 3D memory die 160) may include two or more memory arrays 170, which may be stacked or positioned beside one another (e.g., relative to a substrate).

A local memory controller 165 may include components (e.g., circuitry, logic) operable to control operations of a memory die 160. In some examples, a local memory controller 165 may be operable to communicate (e.g., receive or transmit data or commands or both) with a memory system controller 155. In some examples, a memory system 110 may not include a memory system controller 155, and a local memory controller 165 or an external memory controller 120 may perform various functions described herein. As such, a local memory controller 165 may be operable to communicate with a memory system controller 155, with other local memory controllers 165, or directly with an external memory controller 120, or a processor 125, or any combination thereof. Examples of components that may be included in a memory system controller 155 or a local memory controller 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, sense components for sensing states of memory cells of a memory array 170, write components for writing states to memory cells of a memory array 170, or various other components operable for supporting described operations of a memory system 110.

A host system 105 (e.g., an external memory controller 120) and a memory system 110 (e.g., a memory system controller 155) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, an electrically conductive path) between terminals associated with the components of the system 100. For example, a channel 115 may be associated with a first terminal (e.g., including one or more pins, including one or more pads) at the host system 105 and a second terminal at the memory system 110. A terminal may be an example of a conductive input or output point of a device of the system 100, and a terminal may be operable to act as part of a channel 115.

In some examples, a channel 115 (e.g., associated signal paths and terminals) may be dedicated to communicating one or more types of information. For example, the channels 115 may include one or more command and address channels, one or more clock signal channels, one or more data channels, among other channels or combinations thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols of a signal may be registered for each clock cycle (e.g., on both a rising edge and a falling edge of a clock signal).

In some implementations, interconnection techniques for memory dies 160 may have limitations associated with a quantity of contacts supported for a given die size (e.g., contact density limitations), or a throughput of information between the control circuitry and a host (e.g., data rate limitations), or an amount of storage for a given die size (e.g., storage density limitations), among other limitations. In accordance with examples as disclosed herein, circuitry for accessing one or more memory arrays 170 may be distributed among multiple semiconductor dies of a stack. For example, a first die may include a set of one or more memory arrays 170 and a first portion of the circuitry configured to access the set of memory arrays 170 (e.g., a first interface block), and a second die may include a second portion of the circuitry configured to access the set of memory arrays 170 (e.g., a second interface block). In some examples, the second die may also include the host itself (e.g., a host system 105, an external memory controller 120, a processor 125). Such an architecture may be extended by including multiple sets of memory arrays 170 on a given first die, each with a respective first portion of the access circuitry, or by stacking a set of multiple first dies over a given second die, or both, such that the second die includes a respective second portion of the access circuitry for each set of memory arrays of the one or more first dies in the stack. By implementing memory access circuitry among multiple semiconductor dies in accordance with one or more of the described techniques, a memory system may be configured with improved techniques for repairing failures of components or interconnections among the memory dies, including techniques for differentiating repair solutions in response to column failures, serialization failures, or contact or other interconnection failures, among other differing types of failures, compared with other techniques for repairing failures of a memory system.

Figure 2:
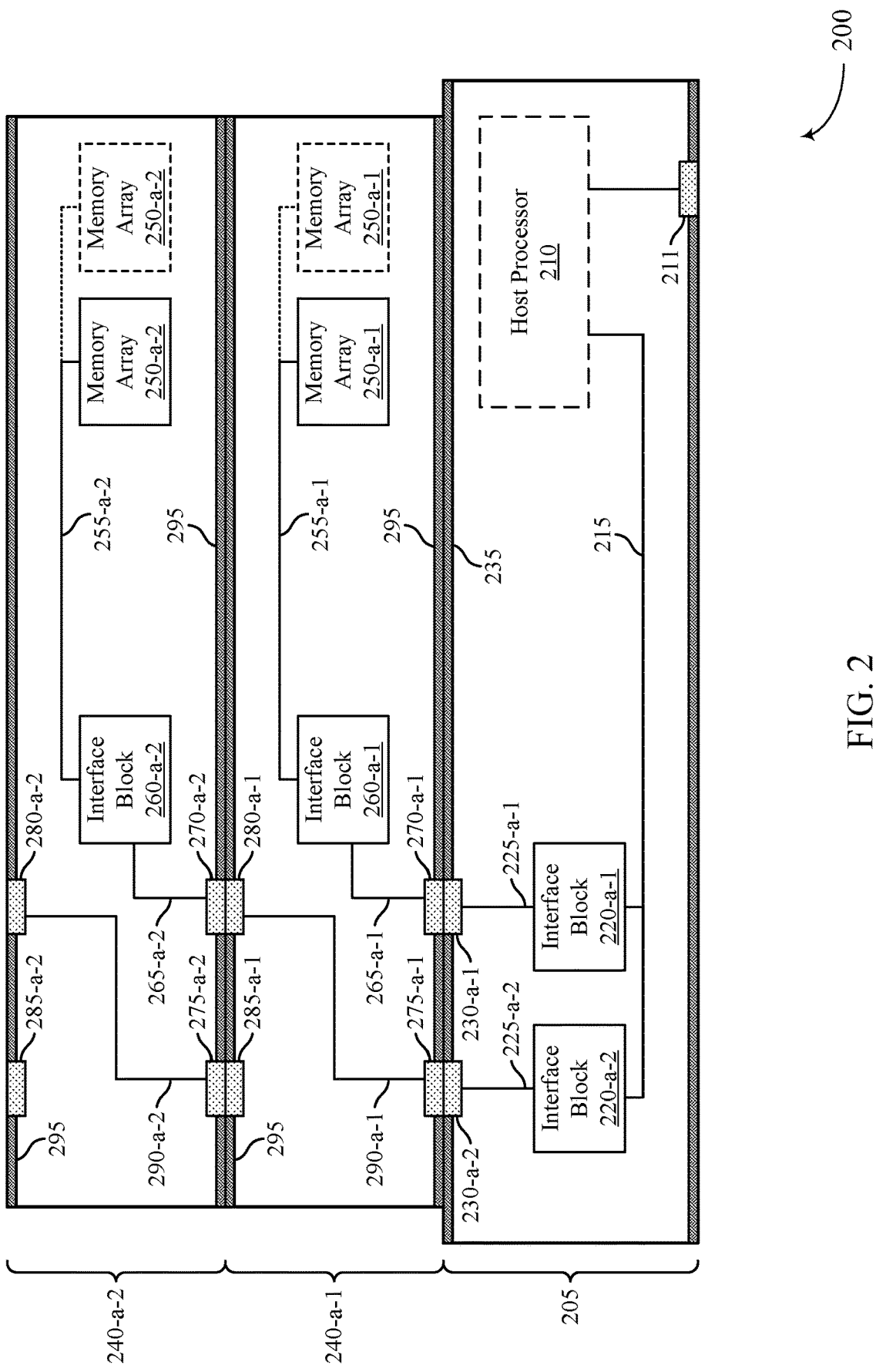
FIG. 2 illustrates an example of a system that supports repair techniques for coupled host and memory dies in accordance with examples as disclosed herein.

FIG. 2 illustrates an example of a system 200 (e.g., a semiconductor system, a system of coupled semiconductor dies) that supports repair techniques for coupled host and memory dies in accordance with examples as disclosed herein. The system 200 illustrates an example of a die 205 (e.g., a semiconductor die, a processor die, a logic die, a host die) that is coupled with one or more dies 240) (e.g., dies 240-*a*-1 and 240-*a*-2, semiconductor dies, array dies, memory dies). A die 205 or a die 240 may be formed using a respective semiconductor substrate (e.g., silicon, germanium, silicon-germanium alloy, gallium arsenide, gallium nitride), such as a semiconductor wafer (e.g., a wafer of crystalline semiconductor), or a silicon-on-insulator (SOI) substrate (e.g., silicon-on-glass, (SOG), silicon-on-sapphire (SOP)), or epitaxial semiconductor materials formed on another substrate, among other examples. Although the illustrated example of a system 200 includes two dies 240, a system 200 in accordance with the described techniques may include any quantity of one or more dies 240 coupled with a die 205.

The system 200 illustrates an example of interface circuitry between a host and memory that is implemented in (e.g., divided between) multiple semiconductor dies. For example, the die 205 may include a set of one or more interface blocks 220 (e.g., interface blocks 220-*a*-1 and 220-*a*-1, memory interface blocks), and each die 240 may include a set of one or more interface blocks 260 and one or more memory arrays 250) (e.g., die 240-*a*-1 including an interface block 260-*a*-1 coupled with a set of one or more memory arrays 260-*a*-1, die 240-*a*-2 including an interface block 260-*a*-2 coupled with a set of one or more memory arrays 260-*a*-2). In some implementations, the die 205 also may include a host processor 210. However, in some other implementations, a host processor 210 may be external to a die 205, such as in another semiconductor die or other component that is coupled with (e.g., communicatively coupled with, directly coupled with) the die 205 via one or more contacts 211. Although the example of system 200 is illustrated with one interface block 260 included in each die 240, a die 240 in accordance with the described techniques may include any quantity of one or more interface blocks 260, each coupled with a respective set of one or more memory arrays 250, and each coupled with a respective interface block 220 of a die 205. Thus, the interface circuitry of a system 200 may include one or more interface blocks 220 of a die 205, with each interface block 220 being coupled with (e.g., in communication with) a corresponding interface block 260 of a die 240 (e.g., external to the die 205).

The host processor 210 may be an example of a host system 105, or a portion thereof (e.g., a processor 125, an external memory controller 120, or both). The host processor 210 may be configured to perform operations that implement storage of the memory arrays 250. For example, the host processor 210 may receive data read from the memory arrays 250, or transmit data to be written the memory arrays 250, or both (e.g., in accordance with an application or other operations of the host processor 210). The memory arrays 250 may be examples of memory arrays 170, and may include memory cells of various architectures, such as RAM, DRAM, SDRAM, SRAM, FeRAM, MRAM, RRAM, PCM, chalcogenide, NOR, or NAND memory cells, or any combination thereof. The host processor 210 may be configured to communicate (e.g., transmit, receive) signaling with the interface blocks 220 over a bus 215, which may implement aspects of channels 115 described with reference to FIG. 1. For example, the host processor 210 may be configured to transmit access signaling (e.g., control signaling, access command signaling), which may be received by the interface blocks 220 to support access operations (e.g., read operation, write operations) on the memory arrays 250.

A bus 215 may include a respective set of one or more signal paths for each interface block 220, such that the host processor 210 communicates with each interface block 220 over the respective set of signal paths (e.g., in accordance with a selection of the respective set to perform access operations via an interface block 220 that is selected by the host processor 210). Additionally, or alternatively, a bus 215 may include one or more signal paths that are shared among multiple interface blocks 220, and an interface block 220, or a host processor 210, or both may interpret, ignore, respond to, or inhibit response to signaling over shared signal paths of the bus 215 based on a logical indication (e.g., an addressing indication associated with the interface block 220 or an interface enable signal, which may be provided by the host processor 210 or the corresponding interface block 220, depending on signaling direction).

Each interface block 220 may be coupled with at least a respective bus 225 of the die 205, and a respective bus 265 of a die 240, that is configured to communicate signaling with the corresponding interface block 260 (e.g., over one or more associated signal paths). For example, the interface block 220-*a*-1 may be coupled with the interface block 260-*a*-1 via a bus 225-*a*-1 and a bus 265-*a*-1, and the interface block 220-*a*-2 may be coupled with the interface block 260-*a*-2 via a bus 225-*a*-2 and a bus 265-*a*-2. In some examples, a die 240 may include a bus that bypasses operational circuitry of the die 240 (e.g., bypasses interface blocks 260 of a given die 240), such as a bus 290. For example, the interface block 220-*a*-2 may be coupled with the interface block 260-*a*-2 of the die 240-*a*-2 via a bus 290-*a*-1 of the die 240-*a*-1, which may bypass interface blocks 260 of the die 240-*a*-1. Such techniques may be extended for interconnection among more than two dies 240 (e.g., for interconnection via a respective bus 290 of multiple dies 240).

The respective signal paths of the buses 225, 265, and 290 may be coupled with one another, from one die to another, via various arrangements of contacts at the surfaces of interfacing dies. For example, the bus 225-*a*-1 may be coupled with the bus 265-*a*-1 via a contact 230-*a*-1 of (e.g., at a surface of) the die 205 and a contact 270-*a*-1 of the die 240-*a*-1, the bus 225-*a*-2 may be coupled with the bus 290-*a*-1 via a contact 230-*a*-2 of the die 205 and a contact 275-*a*-1 of the die 240-*a*-1, the bus 290-*a*-1 may be coupled with the bus 265-*a*-2 via a contact 280-*a*-1 of the die 240-*a*-1 and a contact 270-*a*-2 of the die 240-*a*-2, and so on. Although each respective bus is illustrated with a single line, coupled via singular contacts, it is to be understood that each signal path of a bus may be associated with respective contacts to support a separate communicative coupling via each signal path of a given bus. In some examples, a bus 290 may traverse a portion of a die 240 (e.g., in an in-plane direction, along a direction different than a thickness direction, in a waterfall arrangement), which may support an arrangement of contacts 230 along a surface of the die 205 being coupled with interface blocks 260 of different dies 240 along a stack direction (e.g., via contacts 275 and 280 that are non-overlapping when viewed along a thickness direction).

The interconnection of interfacing contacts may be supported by various techniques. For example, in a hybrid bonding implementation, interfacing contacts may be coupled by a fusion of conductive materials (e.g., electrically conductive materials) of the interfacing contacts (e.g., without solder or other intervening material between contacts). For example, in an assembled condition, the coupling of the die 205 with the die 240-*a*-1 may include a conductive material of the contact 230-*a*-2 being fused with a conductive material of the contact 275-*a*-1, and the coupling of the die 240-*a*-1 with the die 240-*a*-2 may include a conductive material of the contact 280-*a*-1 being fused with a conductive material of the contact 270-*a*-2, and so on. In some examples, such coupling may include an inoperative fusion of contacts (e.g., a non-communicative coupling, a physical coupling), such as a fusion of the contact 285-*a*-1 with the contact 275-*a*-2, neither of which are coupled with operative circuitry of the dies 240-*a*-1 or 240-*a*-2. In some examples, such techniques may be implemented to improve coupling strength or uniformity (e.g., implementing contacts 285, which may not be operatively coupled with an interface block 260 or an interface block 220), or such a coupling may be a byproduct of a repetition of components that, in various configurations, may be operative or inoperative. (e.g., where, for dies 240) with a common arrangement of contacts 275 and 285, contacts 275-*a*-1 and 280-*a*-1 provide a communicative path for the interface block 260-*a*-2 and the interface block 220-*a*-2, but the contacts 275-*a*-2 and 280-*a*-2 do not provide a communicative path between an interface block 260 and an interface block 220).

In some examples, a fusion of conductive materials between dies (e.g., between contacts) may be accompanied by a fusion of other materials at one or more surfaces of the interfacing dies. For example, in an assembled condition, the coupling of the die 205 with the die 240-*a*-1 may include a dielectric material 235 (e.g., an electrically non-conductive material) of the die 205 being fused with a dielectric material 295 of the die 240-*a*-1, and the coupling of the die 240-*a*-1 with the die 240-*a*-2 may include a dielectric material 295 of the die 240-*a*-1 being fused with a dielectric material 295 of the die 240-*a*-2. In some examples, such dielectric materials may include an oxide, a nitride, a carbide, an oxide-nitride, an oxide-carbide, or other conversion or doping of a semiconductor material of the die 205 or dies 240, among other materials that may support such fusion. However, coupling among dies 205 and dies 240 may be implemented in accordance with other techniques, which may implement solder, adhesives, thermal interface materials, and other intervening materials.

In some examples, dies 240 may be coupled in a stack (e.g., forming a "cube" or other arrangement of dies 240), and the stack may subsequently be coupled with a die 205. In some examples, a respective set of one or more dies 240 may be coupled with each die 205 of multiple dies 205 formed in a wafer (e.g., in a chip-to-wafer bonding arrangement, before cutting the wafer of dies 205), and the dies 205, coupled with their respective set of dies 240, may be separated from one another (e.g., by cutting at least the wafer of dies 205). In some other examples, a respective set of one or more dies 240 may be coupled with a respective die 205 after the die 205 is separated from a wafer of dies 205 (e.g., in a chip-to-chip bonding arrangement).

The buses 225, 265, and 290 may be configured to provide a configured signaling (e.g., a coordinated signaling, a logical signaling, modulated signaling, digital signaling) between an interface block 220 and a corresponding interface block 260, which may involve various modulation or encoding techniques by a transmitting interface block (e.g., via a driver component of the transmitting interface block). In some examples, such signaling may be supported by (e.g., accompanied by) clock signaling communicated via the respective buses (e.g., in coordination with signal transmission). For example, the buses may be configured to convey one or more clock signals transmitted by the interface block 220 for reception by the interface block 260 (e.g., to trigger signal reception by a latch or other reception component of the interface block 260, to support clocked operations of the interface block 260). Additionally, or alternatively, the buses may be configured to convey one or more clock signals transmitted by the interface block 260 for reception by the interface block 220 (e.g., to trigger signal reception by a latch or other reception component of the interface block 220, to support clocked operations of the interface block 220). Such clock signals may be associated with the communication (e.g., unidirectional communication, bidirectional communication) of various, such as control signaling, command signaling, data signaling, or any combination thereof. For example, the buses may include one or more signal paths for communications of a data bus (e.g., a DQ bus, via a data interface of the interface blocks) in accordance with one or more corresponding clock signals (e.g., data clock signals), or one or more signal paths for communications of a control bus (e.g., a command/address (C/A) bus, via a command interface of the interface blocks) in accordance with one or more clock signals (e.g., control clock signals), or any combination thereof.

Interface blocks 220 and 260 each may include circuitry in various configurations (e.g., hardware configurations, logic configurations, software or instruction configurations) that support the functionality allocated to the respective interface block for accessing a corresponding set of memory arrays 250. For example, interface blocks 220 may include circuitry configured to perform a first subset of operations that support access of the memory arrays 250, and interface blocks 260 may include circuitry configured to support a second subset of operations that support access of the memory arrays 250). In some examples, the interface blocks 220 and 260 may support a functional split or distribution of functionality associated with a memory system controller 155, a local memory controller 165, or both across multiple dies (e.g., a die 205 and at least one die 240). Such subsets of operations may include operations performed in response to commands from the host processor 210, or operations performed without commands from the host processor 210 (e.g., operations determined within an interface block 220 or within an interface block 260), or various combinations thereof. The circuitry of interface blocks 220 and 260 may include components (e.g., transistors) formed at least in part from doped portions of a substrate of the respective die where, in some examples, a substrate of a die 205 may have characteristics that are different than those substrate of a die 240.

In some examples, the interface blocks 220 may include circuitry configured to receive first access command signaling from the host processor 210 (e.g., via a bus 215, via one or more contacts 211, where applicable), and to transmit second access command signaling to the respective (e.g., coupled) interface block 260 based on (e.g., in response to) the received first access command signaling. The interface blocks 260 may accordingly include circuitry configured to receive the second access command signaling from the respective interface block 220, and to access a respective set of one or more memory arrays 250) based on (e.g., in response to) the received second access command signaling. In various examples, the first access command signaling may include access commands that are associated with a type of operation (e.g., a read operation, a write operation, a refresh operation, a memory management operation), which may be associated with an indication of an address of the one or more memory arrays 250) (e.g., a logical address, a physical address). In some examples, the first access command signaling may include an indication of a logical address associated with the memory arrays 250, and circuitry of an interface block 220 may be configured to generate the second access command signaling to indicate a physical address associated with the memory arrays 250 (e.g., a row address, a column address, using a logical-to-physical (L2P) table or other mapping or calculation functionality of the interface block 220).

In some examples, to support write operations of the system 200, circuitry of the interface blocks 220 may be configured to receive (e.g., from the host processor 210, via a bus 215, via one or more contacts 211, where applicable) first data signaling associated with the first access command signaling, and to transmit second data signaling (e.g., associated with second access command signaling) based on received first access command signaling and first data signaling. The interface blocks 260 may accordingly be configured to receive second data signaling, and to write data to one or more memory arrays 250 (e.g., in accordance with an indicated address associated with the first access command signaling) based on the received second access command signaling and second data signaling. In some examples, the interface blocks 220 may include an error control functionality (e.g., error detection circuitry, error correction circuitry, error correction code (ECC) logic, an ECC engine) that supports the interface blocks 220 generating the second data signaling based on performing an error control operation using the received first data signaling (e.g., detecting or correcting an error in the first data signaling, determining one or more parity bits to be conveyed in the second data signaling and written with the data).

In some examples, to support read operations of the system 200, circuitry of the interface blocks 260 may be configured to read data from the memory arrays 250 based on received second access command signaling, and to transmit first data signaling based at least in part on the read data. The interface blocks 220 may accordingly be configured to receive first data signaling, and to transmit second data signaling (e.g., to the host processor 210, via a bus 215, via one or more contacts 211, where applicable) based on the received first data signaling. In some examples, the interface blocks 220 may include an error control functionality that supports the interface blocks 220 generating the second data signaling based on performing an error control operation using the received first data signaling (e.g., detecting or correcting an error in the first data signaling, which may include a calculation involving one or more parity bits received with the first data signaling).

In some examples, access command signaling that is transmitted by the interface blocks 220 to the interface blocks 260 may be generated (e.g., based on access command signaling received from a host processor 210, based on initiation signaling received from a host processor 210, without receiving or otherwise independent from signaling from a host processor 210) in accordance with various determination or generation techniques configured at the interface blocks 220 (e.g., based on a configuration for accessing memory arrays 250 that is modified at the interface blocks 220). Such techniques may support the interface blocks 220 configuring aspects of the access operations performed on the memory arrays 250 by a respective interface block 260.

In some examples, one or more interface blocks 220 may be configured to support a repair functionality for accessing memory arrays 250, which may be included as part of a reliability, availability, and serviceability (RAS) solution supported by the interface blocks 220. For example, an interface block 220 may be configured to map out or map around regions of a die 240 (e.g., of an interface block 260, of a memory array 250) that are associated with a failure. When mapping out or mapping around a region of a memory array 250, such regions can be as small as single column of a memory array 250, or may be successively larger regions, such as array sections, multiple array sections, banks, and even entire channels. A die 240 may be overprovisioned to allow for remapping so that elements in a dedicated region can be used for remapping within a channel or across channels to statically or dynamically replace failing regions of varying size. In some examples, such techniques may support improvements to overall product yield (e.g., a yield of dies 240, a yield of dies 205, a yield of systems 200), even if such techniques may reduce an amount of overall memory capacity. In some examples, such a failure may be detected by the interface block 220, or by an interface block 260 and signaled to the interface block 220, or by the host processor 210 and indicated to the interface block. Additionally, or alternatively, such a failure may be detected in a manufacturing or validation operation (e.g., of manufacturing a die 240, of manufacturing a die 205, of manufacturing a system 200), and an indication of the failure may be stored in the system 200 in a manner accessible to the interface block 220 (e.g., in a register of or accessible to the interface block 220).

Figure 3:
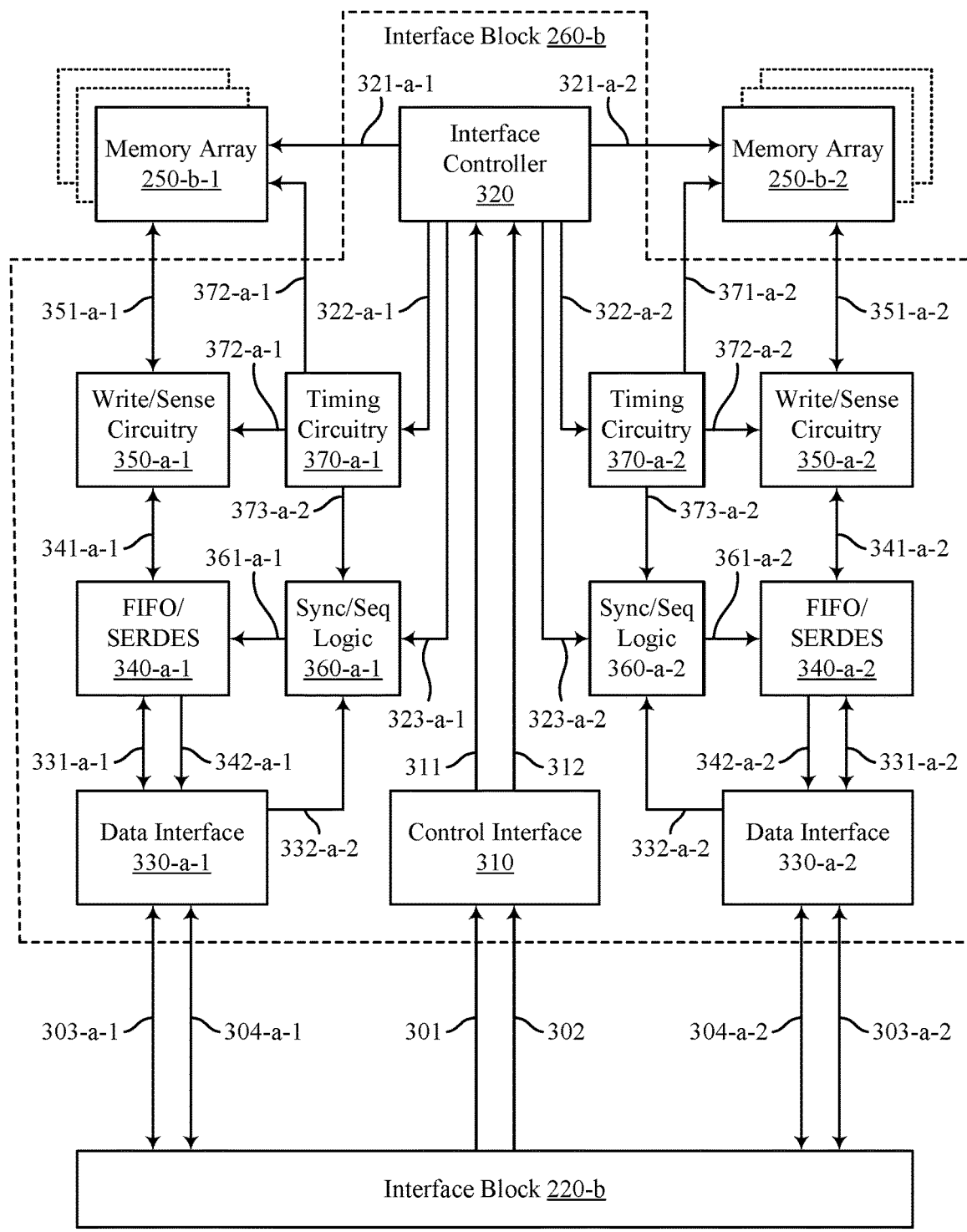
FIG. 3 illustrates an example of an architecture that support repair techniques for coupled host and memory dies in accordance with examples as disclosed herein.
Figure 4:
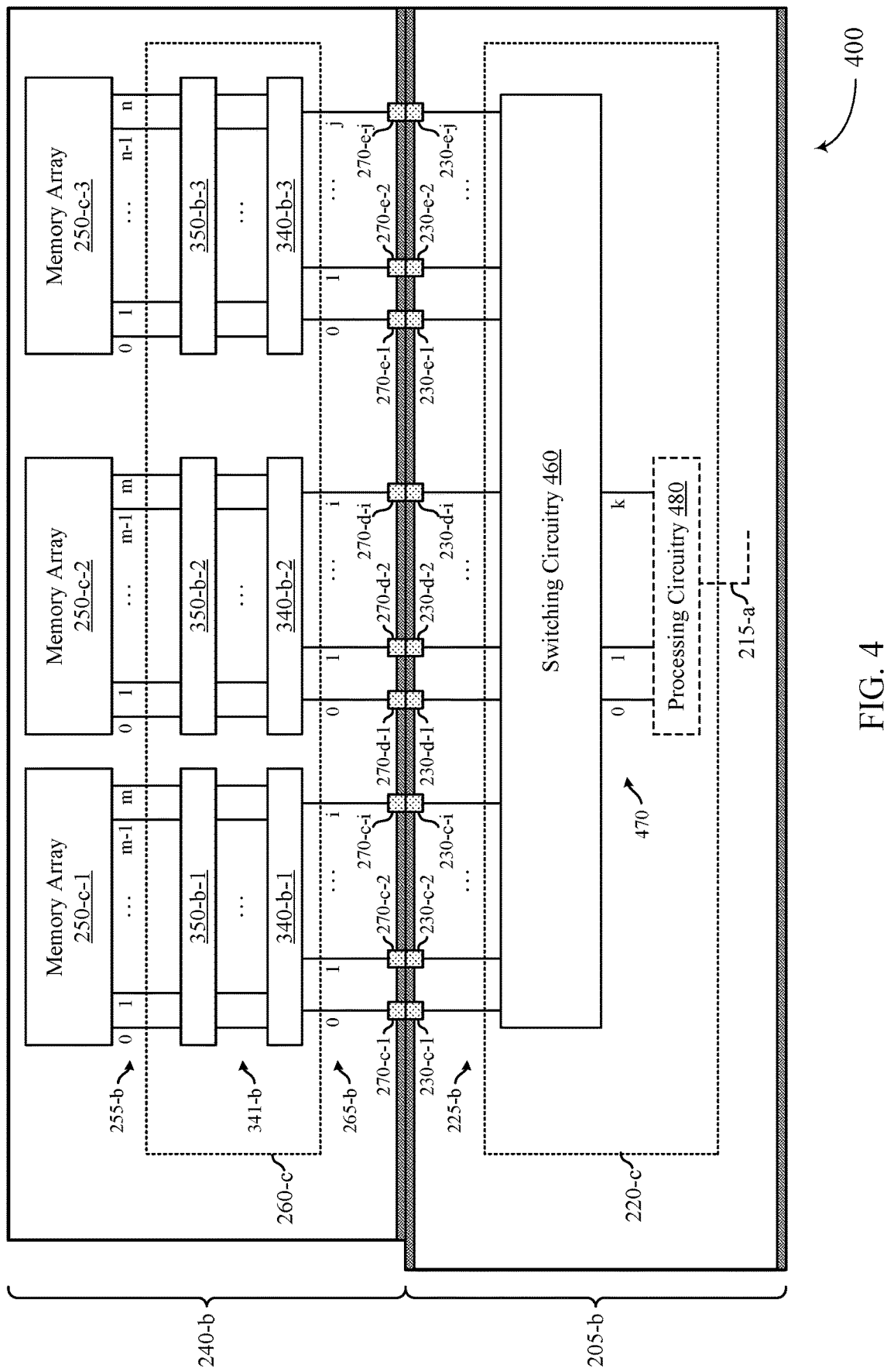
FIGS. 4 through 10 illustrate an example of architectures, and implementations thereof, that support repair techniques for coupled memory dies in accordance with examples as disclosed herein.

FIG. 3 illustrates an example of an architecture 300 that supports repair techniques for coupled host and memory dies in accordance with examples as disclosed herein. The architecture 300 illustrates an example of an interface block 260-*b* (e.g., of a die 240) coupled with an interface block 220-*b* (e.g., of a die 205). The interface block 260-*b* may be communicatively coupled with the interface block 220-*b* via one or more of a bus 301, a bus 302, a bus 303, and a bus 304, each of which may be examples of one or more signal paths of a bus 225 and a bus 265, as well as a bus 290, where applicable.

The interface block 260-*b* includes a control interface 310 (e.g., a command interface), which may be configured to communicate signaling with the interface block 220-*b*. For example, the control interface 310 may include circuitry (e.g., a receiver, one or more latches) configured to receive control signaling (e.g., modulated control signaling, access command signaling, configuration signaling, address signaling, such as row address signaling or column address signaling) over the bus 301. The control interface 310 also may include circuitry configured to receive clock signaling (e.g., clock signaling associated with the control interface 310, clock signaling having one or more phases, such as true and complement phases, dk_t/c signaling from the interface block 220-*b*) over the bus 302, which the control interface 310 may use for receiving the control signaling of the bus 301 (e.g., for triggering the one or more latches). The control interface 310 may transmit (e.g., forward) the control signaling over a bus 311, and may transmit the clock signaling over a bus 312 (e.g., for timing of other operations of the interface block 260-*b*), each of which may be received by an interface controller 320).

The interface block 260-*b* also includes two data interfaces 330 (e.g., data interfaces 330-*a*-1 and 330-*a*-2), which also may be configured to communicate signaling with the interface block 220-*b*. Each data interface 330 may include corresponding buses and circuitry, the operation of which may be associated with (e.g., controlled by, coordinated with, operated based on) control signaling via the control interface 310. Although the example of interface block 260-*b* includes two such data interfaces 330 associated with the control interface 310 (e.g., in a "channel pair" arrangement), the described techniques for an interface block 260 may include any quantity of one or more data interfaces 330, and associated buses and circuitry, for a given control interface 310 of the interface block 260. Each data interface 330 may be associated with respective data path circuitry, which may include respective first-in-first-out (FIFO) and serialization/deserialization (SERDES) circuitry (e.g., FIFO/SERDES), respective write/sense circuitry 350, respective synchronization and sequencing circuitry (e.g., sync/seq logic 360), and respective timing circuitry 370, along with interconnecting signal paths (e.g., one or more buses). However, in some other examples, data path circuitry may be arranged in a different manner, or may include different circuitry components, which may include circuitry that is dedicated to respective data paths, or shared among data paths, or various combinations thereof. Each data interface 330 also may be associated with a respective set of one or more memory arrays 250. In some examples, each memory array 250 may be understood to include respective addressing circuitry such as bank logic or decoders (e.g., a row decoder, a column decoder), among other array circuitry (e.g., sense amplifiers, latches). However, in some other examples, at least a portion of such circuitry may be included in the interface block 260.

Each data interface 330 may include circuitry (e.g., one or more latches, one or more drivers) configured to communicate (e.g., receive, transmit) data signaling (e.g., modulated data signaling, DQ signaling) over a respective bus 303. Each data interface 330 also may include circuitry to communicate clock signaling over a respective bus 304, which may support clock signal reception by the data interface 330 (e.g., first clock signaling associated with the data interface 330, clock signaling having one or more phases, such as true and complement phases, DQS_t/c signaling from the interface block 220-*b*, clock signaling associated with data reception or write operations), or clock signal transmission by the data interface 330 (e.g., second clock signaling associated with the data interface 330), RDQS_t/c signaling to the interface block 220-*b*, clock signaling associated with data transmission or read operations), or both. Each data interface 330 may transmit clock signaling (e.g., received clock signaling. DQS_t/c signaling) over a respective bus 332 (e.g., for timing of other operations of the interface block 260-b).

The interface controller 320 may support various control or configuration functionality of the interface block 260-b for accessing or otherwise managing operations of the coupled memory arrays 520. For example, the interface controller 320 may support access command coordination or configuration, latency or timing compensation, access command buffering (e.g., in accordance with a first-in-first-out FIFO or other organizational scheme), mode registers or logic for configuration settings, or test functionality, among other functions or combinations thereof. For each data path of the interface block 260 (e.g., associated with a respective data interface 330), the interface controller 320 may be configured to transmit signaling to the respective memory arrays 250 over a bus 321 (e.g., address signaling, such as a row address or row activation signaling), to transmit signaling to the respective timing circuitry 370 over a bus 322 (e.g., timing signaling, which may be based on clock signaling received via the bus 312, configuration signaling), and to transmit signaling to the respective sync/seq logic 360 over a bus 323 (e.g., timing signaling, which may be based on clock signaling received via the bus 312, configuration signaling).

For each data path, the respective timing circuitry 370 may support timing of various operations (e.g., activations, coupling operations, signal latching, signal driving) relative to timing signaling received over a bus 322. For example, timing circuitry 370 may include a timing chain (e.g., a global column timing chain) configured to generate one or more clock signals or other initiation signals for controlling operations of the respective data path, and such signaling may include transitions (e.g., rising edge transitions, falling edge transitions, on/off transitions) that are offset from, at a different rate than, or otherwise different than transitions of signaling over the bus 322 to support a given operation or combination of operations. For example, timing circuitry 370 may be configured to transmit signaling to the respective memory arrays 250 over a bus 371 (e.g., column selection signaling, column address signaling), to transmit signaling to the respective write/sense circuitry 350 over a bus 372 (e.g., latch or driver timing signaling), and to transmit signaling to the respective sync/seq logic over a bus 373 (e.g., timing signaling).

For each data path, the respective FIFO/SERDES 340 may be configured to convert between data signaling of a first bus width (e.g., a relatively wide bus width, associated with a bus 341 (e.g., a data read/write (DRW) bus), having a relatively larger quantity of signal paths) and a second bus width (e.g., a relatively narrow bus width, associated with a bus 331, having a relatively smaller quantity of signal paths). In some examples, such a conversion may be accompanied by changing a rate of signaling between the bus 341 and the bus 331 (e.g., to maintain a given throughput). For example, a FIFO/SERDES 340 may support a conversion between the bus 341 having a bus width of 288 signal paths (e.g., for signaling Dat[287:0]) and the bus 331 having a bus width of 72 signal paths (e.g., for signaling DQ[71:0]), in which case a rate of signaling over the bus 331 may be four times as fast as a rate of signaling over the bus 341. In various examples, the FIFO/SERDES may receive data signaling over the bus 331 and transmit data signaling over the bus 341 (e.g., to support a write operation), or may receive data signaling over the bus 341 and transmit data signaling over the bus 331 (e.g., to support a read operation). In some examples (e.g., to support a read operation), the FIFO/SERDES 340 may be configured to transmit clock signaling (e.g., RDQS_t/c signaling) to the data interface 330, which may be forwarded to the interface block 220-b (e.g., over a bus 304, for reception of data signaling by the interface block 220-b received over a bus 331).

The timing or other synchronization of operations performed by the FIFO/SERDES 340 may be supported by one or more clock signals, among other signaling, received from the respective sync/seq logic 360 (e.g., over a bus 361). For example, the sync/seq logic 360 may generate or otherwise coordinate clock signaling to support the different rates of signaling of the bus 331 and the bus 341 (e.g., based on clock signaling received over a bus 332 and a bus 373). Additionally, or alternatively, the FIFO/SERDES 340 may operate in a direction (e.g., for data transmission to a data interface 330, for data reception from a data interface 330) or other mode based on configuration signaling received from the sync/seq logic 360.

For each data path, the respective write/sense circuitry 350 may be configured to support the accessing (e.g., data signaling, write signaling, read signaling) of the respective set of one or more memory arrays 250. For example, the write/sense circuitry 350 may be coupled with the memory arrays 250 over a bus 351 (e.g., a global input/output (GIO) bus), which may include respective signal paths associated with each memory array 250, or may include signal paths that are shared for all of the memory arrays 250 of the set, in which case the memory array circuitry may include multiplexing circuitry operable to couple the bus 351 with a selected one of the memory arrays 250. In some examples, a bus 351 may include a same quantity of signal paths as a bus 341 (e.g., for signaling GIO[287:0]). In some examples, a bus 351 may include a same quantity of signal paths as a quantity of columns in each memory array 250. In some other examples, the memory arrays 250 may include a quantity of columns that is an integer multiple of the quantity of signal paths of a bus 351, in which case the memory array circuitry (e.g., each memory array 250) may include decoding circuitry operable to couple a subset of columns of memory cells, or associated circuitry, with the bus 351.

To support write operations, the write/sense circuitry 350 may be configured to drive signaling (e.g., over the bus 351) that is operable to write one or more logic states to memory cells of the memory arrays 250 (e.g., based on data received over a bus 341, based on timing signaling received over a bus 371, based on data signaling received over a bus 303 and on control signaling received over a bus 301). In some examples, such signaling may be transmitted to supporting circuitry of or otherwise associated with the memory arrays 250 (e.g., as an output of signals corresponding to logic states to be written), such as sense amplifier circuitry, voltage sources, current sources, or other driver circuitry operable to apply a bias across a storage element of the memory cells (e.g., across a capacitor, across a ferroelectric capacitor), or apply a charge, a current, or other signaling to a storage element of the memory cells (e.g., to apply a current to a chalcogenide or other configurable memory material, to apply a charge to a gate of a NAND memory cell), among other examples.

To support read operations, the write/sense circuitry 350 may be configured to receive signaling (e.g., over the bus 351) that the write/sense circuitry 350 may further amplify for communication through the interface block 260-b. For example, the write/sense circuitry 350 may be configured to receive signaling corresponding to logic states read from the memory arrays 250, but at a relatively low driver strength (e.g., relatively 'analog' signaling, which may be associated with a relatively low drive strength of sense amplifiers of the memory arrays 250, such as p-type n-type sense amplifiers (PNSA)). The write/sense circuitry 350 may thus include further sense amplification (e.g., a data sense amplifier (DSA) or other latch between each signal path of the bus 351 and a respective signal path of the bus 341), which each may have a relatively high drive strength (e.g., for driving relatively 'digital' signaling over the bus 341).

The features of the architecture 300 may be duplicated in various quantities and arrangements to support a semiconductor system having multiple dies, such as various examples of a system 200. In an example implementation, each die 240 may be configured with 64 instances of the interface block 260-b, which may support a data signaling width of 9,216 signal paths for each die 240 (e.g., where each bus 303 of a channel pair is associated with 72 signal paths). For a system 200 having a stack of eight dies 240 coupled with a die 205, the die 205 may thus be configured with 512 instances of the interface block 220-b, thereby supporting an overall data signaling width of 73,738 signal paths for the system 200. However, in other implementations, dies 205 and dies 240 may be configured with different quantities of interface blocks 220 and 260, respectively, and a system 200 may be configured with different quantities of dies 240 per die 205. By dividing memory access circuitry among multiple semiconductor dies (e.g., a die 205 and one or more dies 240) in accordance with one or more of the described techniques, a system 200 may thus be configured with an increased throughput of information, or a greater storage density, among other advantages, compared with other techniques for configuring a memory system.

FIGS. 4 through 9 illustrate an example of an architecture 400, and implementations thereof, that support repair techniques for coupled host and memory dies in accordance with examples as disclosed herein. The architecture 400 illustrates an example of a die 205-b that is coupled with a die 240-b (e.g., via contacts 230 and contacts 270, including a communicative coupling). Although shown as a direct coupling, the described techniques may be implemented in systems where a die 240 is indirectly coupled with a die 205, such as a coupling via one or more intervening semiconductor dies (e.g., one or more intervening dies 240, via one or more buses 290, contacts 275, or contacts 280). Further, although the illustrated example of architecture 400 includes a single die 240, the described techniques may be implemented in systems that include any quantity of one or more dies 240 that are communicatively coupled with a die 205.

The die 240-b includes a set of memory arrays 250-c (e.g., memory arrays 250-c-1, 250-c-2, and 250-c-3). In some examples, the memory arrays 250-c-1 and 250-c-2 may be main arrays and the memory array 250-c-3 may be a redundancy array (e.g., an array and associated access circuitry that is allocated to repair functionality). In various examples, such designations may be made as part of a design configuration (e.g., as a preconfiguration, as a layout configuration), or the memory array 250-c-3 may be selected as a redundancy array (e.g., based on operational or manufacturing characteristics, such as selecting the memory array 250-c-3 based on relatively lower performance than other memory arrays 250 in the memory die 240-b or having a relatively higher quantity of failures, but being configurable for repair functionality). In various examples, the memory array 250-c-3 may be formed with the same configuration (e.g., a same quantity of rows, a same quantity of columns, a same set of access circuitry) as the memory arrays 250-c-1 and 250-c-2, or with different configurations. In some examples, rows of the memory arrays 250-c-1, 250-c-2, and 250-c-3 may be activated by a common word lines that span all of the memory arrays 250-c, or may be activated by respective word lines that are independently addressed.

Although operations of the architecture 400 may be described in the context of two memory arrays (e.g., memory arrays 250-c-1 and 250-c-2, main arrays) operating with one redundancy array (e.g., memory array 250-c-3), the described techniques may be performed with any quantity or ratio of main arrays and redundancy arrays. In some examples, such main arrays may be allocated to same types of information (e.g., where each main memory array 250 is configured to include data, parity information or other error control information, or a combination thereof), or may be allocated to different types of information or operations (e.g., where one or more memory arrays 250), or portions thereof, may be allocated to data, and one or more memory arrays 250, or portions thereof, may be allocated to parity information or other error control information).

The memory arrays 250-c may be coupled with an interface block 260-c via conductors of a bus 255-b. For example, the memory arrays 250-c-1 and 250-c-2 may each be coupled with the interface block 260-c via a respective portion of the bus 255-b having positions (e.g., information positions, bit positions, data positions, bus positions, bus conductors) 0 through m, and the memory array 250-c-3 may be coupled with the interface block 260-c via a portion of the bus 255-b having positions 0) through n. In some examples, each position of the respective portion of the bus 255-b may correspond to a respective column of memory cells of a memory array 250-c (e.g., where memory arrays 250-c-1 and 250-c-2 may be configured with m+1 columns and memory array 250-c-3 may be configured with n+1 columns). In some other examples, a different relationship may be implemented between columns of memory cells of a memory array 250 and positions of a bus 255, such as a relationship of each position being associated with a respective integer multiple of columns (e.g., in accordance with a multiplexing or decoding arrangement of the memory array 250). In various examples, n may be equal to m, or n may be different than m.

As illustrated in the example of architecture 400, the interface block 260-c includes respective write/sense circuitry 350-b and respective FIFO/SERDES 340-b for each memory array 250-c. However, the interface block 260-c may include other circuitry (e.g., control circuitry, timing circuitry, interface circuitry) for operating the respective memory arrays 250-c (not shown), such as circuitry illustrated in the architecture 300, among other circuitry or arrangements of circuitry. The interface block 260-c may be coupled with contacts 270, as illustrated, via conductors of a bus 265-b. For example, the FIFO/SERDES 340-b-1 and 340-b-2 may be coupled with contacts 270-c and 270-d, respectively, via a respective portion of the bus 265-b having positions 0) through i, and the FIFO/SERDES circuitry 240-c may be coupled with contacts 270-e via a portion of the bus 255-b having positions 0) through j. In some examples, each illustrated position of the respective portion of the bus 265-b or contact 270 may correspond to a position of a bus 303 (e.g., of a data channel). In some examples, variables m and i, and n and j, may be related at least in part by a serialization ratio (e.g., of FIFO/SERDES 340). For example, for a serialization ratio of 4:1, m+1 may be four times as large as i+1, and n+1 may be four times as large as j+1. However, other relationships between such variables may be implemented.

To provide a communicative coupling between the interface block 260-c and a corresponding interface block 220-c of the die 205, each of the contacts 270 may be configured to be coupled with a corresponding contact 230 of the die 205-b. The interface block 220-c may be coupled with the contacts 230, as illustrated, via conductors of a bus 225-b. Although not illustrated, such a communicative coupling may also include coupling between contacts 270) and contacts 230 associated with other signaling, such as signaling of a bus 301, a bus 302, a bus 304, or any combination thereof.

In some examples of a system that implements the architecture 400, a failure may occur in a component of the die 240-b, in a component of the die 205-b, at a connection between the die 240-b and the die 205-b, or various combinations thereof. To support repair techniques that may differentiate between types of failures in a corresponding semiconductor system, the interface block 220-c may include switching circuitry 460, which may be configured to replace (e.g., map out, map around) a failed portion associated with operations of the memory array 250-c-1 or the memory array 250-c-2 by alternatively accessing circuitry associated with the memory array 250-c-3. To support such techniques, the switching circuitry 460 may be configured to determine whether to couple a bus 470 (e.g., a data bus, an interface bus, a data path) with contacts 230-c, 230-d, or 230-e, for a given access operation, based on an error condition (e.g., a presence of an error, a presence of a failure, an absence of an error, an absence of a failure). For example, when accessing the memory array 250-c-1 (e.g., a row of memory cells of the memory array 250-c-1), the switching circuitry 460 may be configured to couple a position of the bus 470 with a contact 230-c (e.g., based on an absence of an error associated with accessing the memory array 250-c-1 via the contact 230-c, based on an absence of errors for data signaling via the contact 230-c), or couple a position of the bus 470 with a contact 230-e (e.g., based on an presence of an error associated with accessing the memory array 250-c-1 via the contact 230-c, based on a presence of an error for data signaling via the contact 230-c).

In some examples, the bus 470 may be coupled with processing circuitry 480 of the interface block 220-c, which may perform operations on data signaling transmitted via the bus 470) or received via the bus 470. For example, the processing circuitry 480 may include error control circuitry (e.g., error detection code (EDC) circuitry, error correction code (ECC) circuitry, cyclic redundancy check (CRC) circuitry) that is operable based on a remapping provided by the switching circuitry 460. Additionally, or alternatively, the processing circuitry 480 may include logic (e.g., processing logic, repair logic) for operating the switching circuitry 460, such as circuitry configured to determine a failure (e.g., by referencing error condition information in a lookup table, by initiating or performing access operations to generate error condition information), or address mapping circuitry (e.g., one or more of a logical-to-physical (L2P) table, a logical-to-logical L2L) table, a redundancy array mapping table, a repair table). In some other examples, the bus 470 may not be coupled with processing circuitry 480, and corresponding signaling may be passed directly to a bus 215-a (e.g., to a host processor of or coupled with the die 205-b).

The switching circuitry 460 may include various configurations of circuitry operable to couple the bus 470 with contacts 230-c, 230-d, or 230-e for a given repair solution. For example, the switching circuitry 460 may include a transistor network or other multiplexing circuitry operable to couple each position of the bus 470 with a contact 230-c, or a contact 230-d, or a contact 230-e. In some implementations, each position of the bus 470 may have a 1:1 correspondence with a single contact 230-c or a single contact 230-d, in which case k+1 may be equal to 2*(i+1). In some other implementations, each position of the bus 470 may have a 1:2 correspondence with a pair of a single contact 230-c and a single contact 230-d, in which case k+1 may be equal to i+1, and the switching circuitry 460 may also include a multiplexing or serialization/deserialization function. To support repair flexibility, the switching circuitry 460 may be configured to support coupling each position of the bus 470 with any one of the contacts 230-c. However, mapping among positions of a bus 255 and a bus 470 may be implemented in accordance with other configurations to support the described repair techniques.

The memory arrays 250-c also may be operated in accordance with various configurations. In some examples (e.g., when the memory arrays 250-c-1, 250-c-2, and 250-c-3 are accessed via a common word line activation), each of the memory arrays 250-c-3 may be configured for communicating signaling with the contacts 270 of the die 240-b, but the communication of signaling with the bus 470 may be dictated by a configuration (e.g., a nominal configuration, a repair configuration) of the switching circuitry 460. For example, in a nominal operating condition, a row of the memory array 250-c-3 may be activated, but may not exchange information with the bus 470 due to a lack of coupling between the bus 470 and the contacts 230-e. In some other examples, the memory array 250-c-3, or some portion thereof, may be activated when (e.g., only when) a repair configuration is enabled (e.g., may be in an idle or inactive condition unless a repair configuration is enabled). Such techniques may involve control signaling (e.g., address signaling, repair configuration signaling) communicated between the interface block 220-c and the interface block 260-c (e.g., via a bus 301, with a control interface 310 or an interface controller 320 of the interface block 260-c, not shown).

Figure 5:
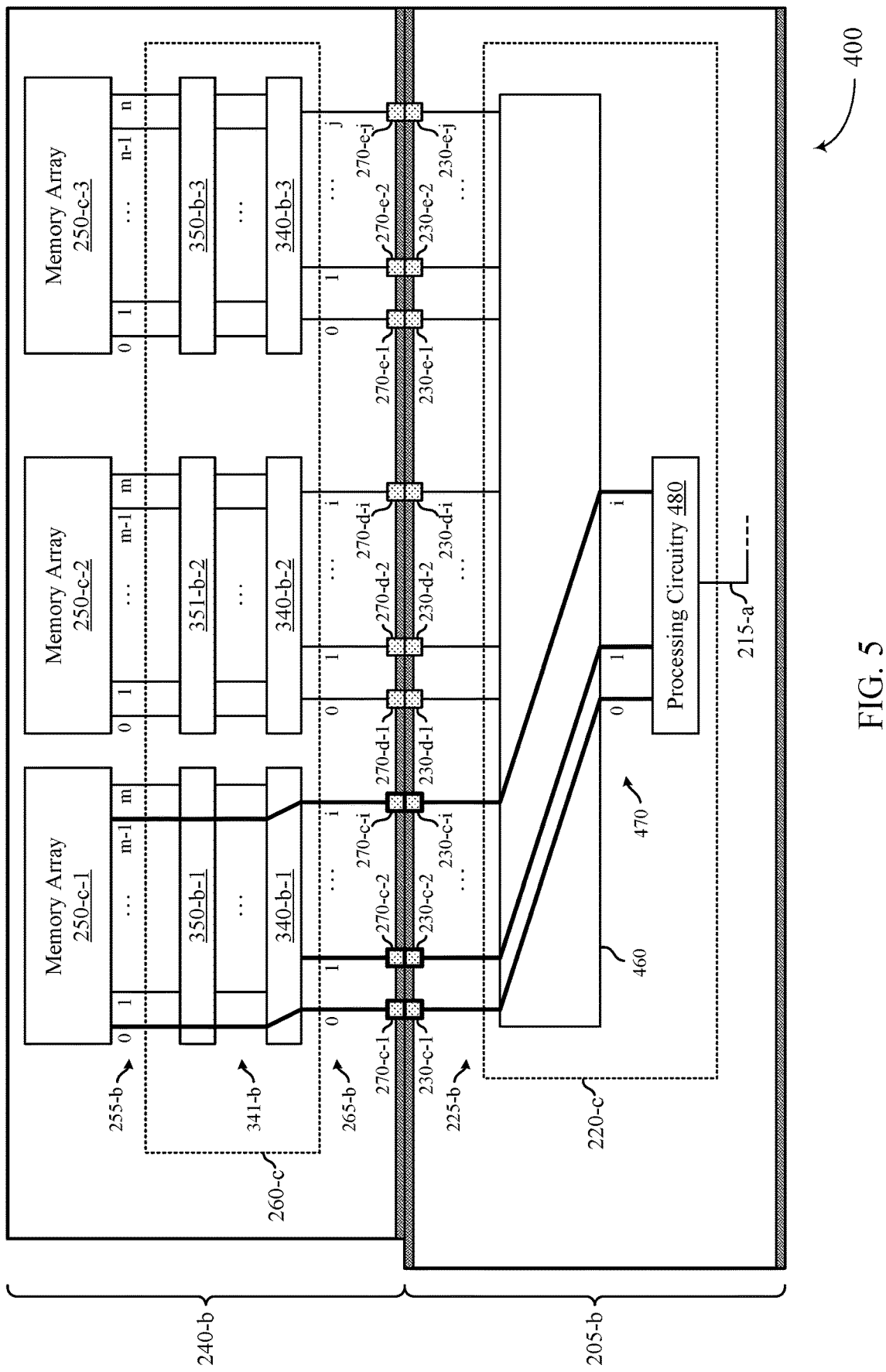
Figure 6:
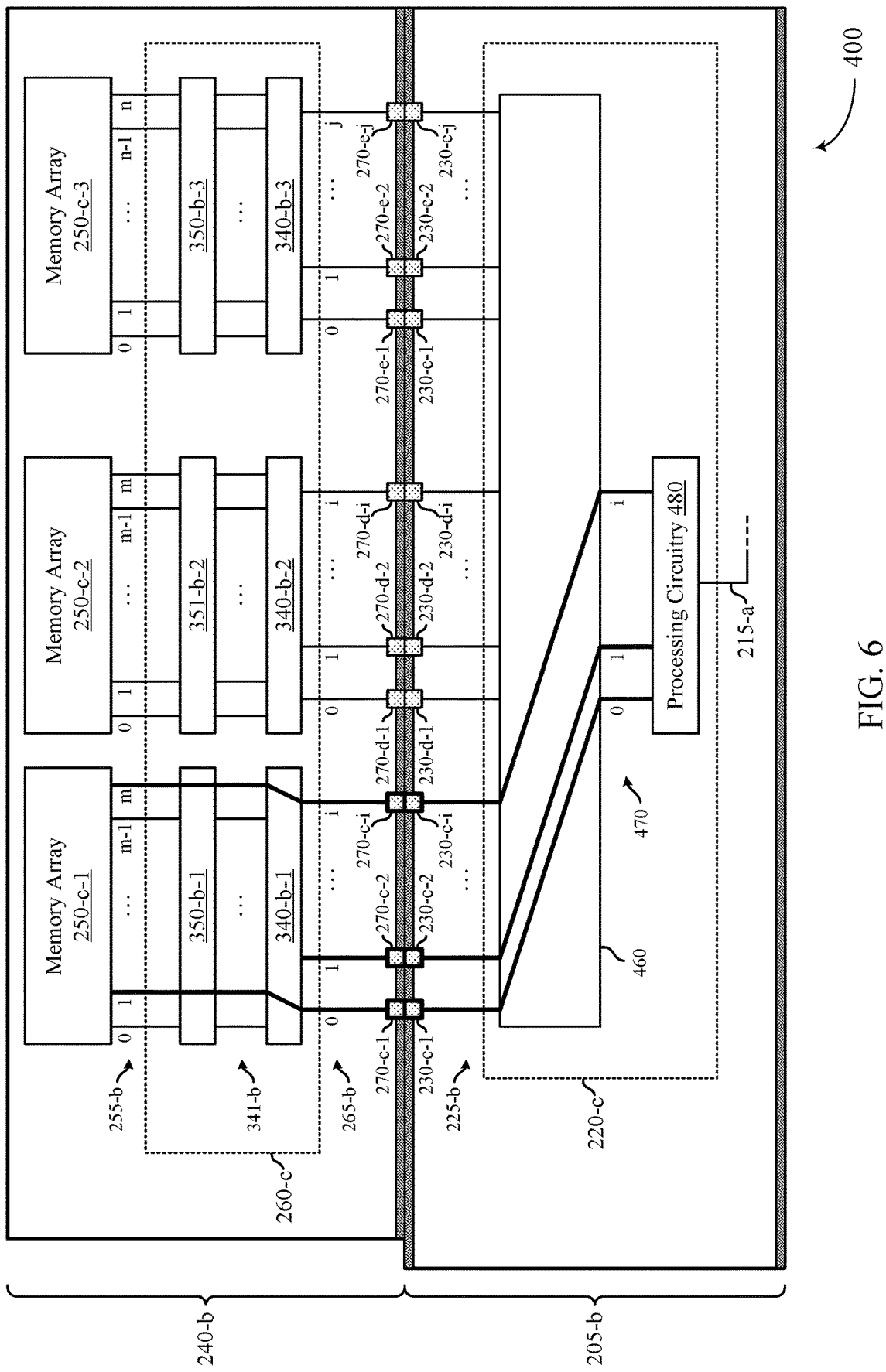

FIGS. 5 and 6 illustrate a first example for implementing the architecture 400. The first example may be implemented for circumstances in which an error condition associated with data signaling via the contacts 230-c-1 and 270-c-1 does not indicate an error (e.g., indicates an absence of an error). For example, FIGS. 5 and 6 may illustrate aspects of the switching circuitry 460 being configured (e.g., by processing circuitry 480, by other circuitry of the interface block 220-c, not shown such repair configuration circuitry) to operate in a nominal operating condition (e.g., associated with normal operations of the memory array 250-c-1).

FIG. 5 illustrates aspects of the first example for accessing the memory array 250-c-1 in accordance with a first SERDES index, for which position 0 of the portion of the bus 341-b (e.g., position 0 of the portion of the bus 255-b) corresponding to the memory array 250-c-1 is mapped with (e.g., routed with, coupled with, connected with) position 0 of the bus 265-b, and position m−1 of the portion of the bus 341-b is mapped with position i of the bus 265-b, and so on. Because the error condition in the first example indicates an absence of errors (e.g., for data signaling via the contact 230-c-1 and the contact 270-c-1), each position of the bus 470 may be mapped (e.g., concurrently) to a corresponding contact 230-c (e.g., to support communicating a bit string, such as transmitting or receiving a data burst, between the interface block 260-c and the bus 470 or the bus 215-a), such that the bus 470 is isolated from the contacts 230-e for the first SERDES index.

FIG. 6 illustrates aspects of the first example for accessing the memory array 250-c-1 in accordance with a second SERDES index, for which position 1 of the portion of the bus 341-b corresponding to the memory array 250-c-1 is mapped with position 0 of the bus 265-b, and position m of the portion of the bus 341-b is mapped with position i of the bus 265-b, and so on. Because the error condition in the first example indicates an absence of errors, each position of the bus 470 may be mapped to a corresponding contact 230-c, such that the bus 470 is also isolated from the contacts 230-e for the second SERDES index. Such conditions may be logically extended for each additional SERDES index applicable to the architecture 400.

Figure 7:
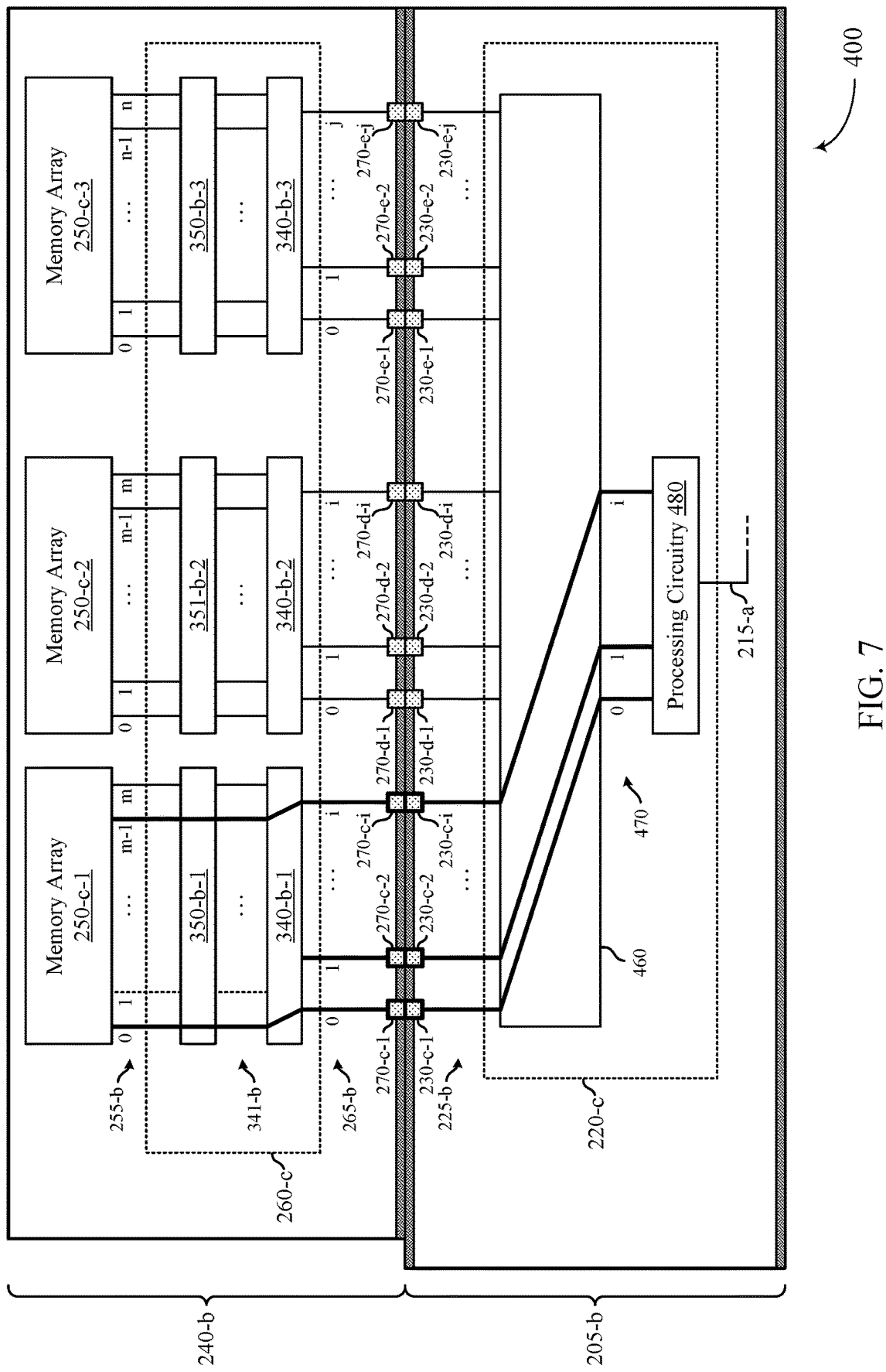
Figure 8:
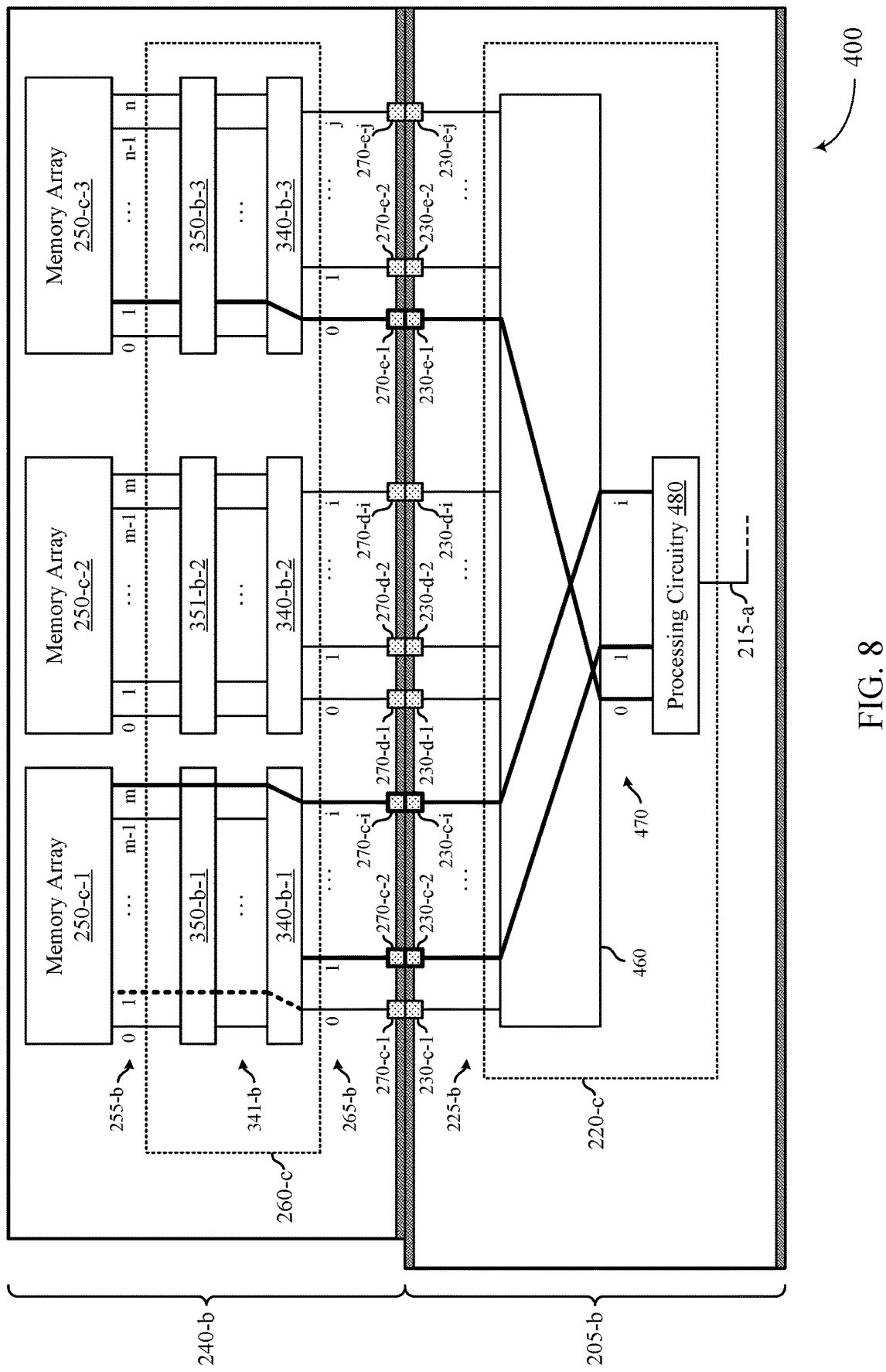

FIGS. 7 and 8 illustrate a second example for implementing the architecture 400. The second example may be implemented for circumstances in which an error condition associated with data signaling via the contacts 230-c-1 and 270-c-1 indicates a presence of an error for some conditions and an absence of an error for some other conditions. For example, FIGS. 7 and 8 may illustrate aspects of the switching circuitry 460 being configured to operate in response to a failure of a column of the array 250-c-1 (e.g., a column associated with the position 1 of the bus 255-b), or circuitry associated with a column of the memory array 250-c-1 (e.g., a position of the bus 255-b, a position of write/sense circuitry 350-b, a position of the bus 341-b, a position of FIFO/SERDES 340) or a combination thereof, which may be referred to as a column repair technique (e.g., to repair a failure associated with a column of the memory array 250-c-1).

FIG. 7 illustrates aspects of the second example for accessing the memory array 250-c-1 in accordance with a first SERDES index, for which position 0 of the portion of the bus 341-b corresponding to the memory array 250-c-1 is mapped with position 0 of the bus 265-b, and position m−1 of the portion of the bus 341-b is mapped with position i of the bus 265-b, and so on. Because the error condition in the second example indicates an absence of errors (e.g., for data signaling via the contact 230-c-1 and the contact 270-c-1, for the column of memory cells or associated circuitry corresponding to position 0 of the portion of the bus 255-b) for the first SERDES index, each position of the bus 470 may be mapped to a corresponding contact 230-c, such that the bus 470 is isolated from the contacts 230-e for the first SERDES index.

FIG. 8 illustrates aspects of the second example for accessing the memory array 250-c-1 in accordance with a second SERDES index, for which position 1 of the portion of the bus 341-b corresponding to the memory array 250-c-1 is mapped with position 0 of the bus 265-b, and the position m of the portion of the bus 341-b is mapped with the position i of the bus 265-b, and so on. Because the error condition in the second example indicates a presence of errors for data signaling via the contact 230-c-1 and the contact 270-c-1 for the second SERDES index (e.g., for the column of memory cells or associated circuitry corresponding to position 0 of the portion of the bus 255-b), position 0 of the bus 470 may be mapped with the contact 230-e-1, accessing position 0 of the portion of the bus 265-b corresponding to the memory array 250-c-3 instead of position 0 of the portion of the bus 265-b corresponding to the memory array 250-c-1. Because the error condition in the second example indicates an absence of errors for data signaling via other contacts 230-c and contacts 270-c for the second SERDES index, the switching circuitry 460 may map the other positions of the bus 470 with respective contacts 230-c.

Although the repair technique of the second example illustrates position 0 of the bus 470 being mapped with the contact 230-e-1, a repair technique in accordance with examples as disclosed herein may include a mapping of position 0 of the bus 470 with any one of the contacts 230-e-1 through 230-e-j. In the example of FIG. 8, position 0 of the portion of the bus 225-b and of the bus 265-b corresponding to the memory array 250-c-3 is mapped (e.g., by FIFO/SERDES 340-b-3) to position 1 of the portion of the bus 225-b corresponding to the memory array 250-c-3, which may support implementing a same FIFO/SERDES index across multiple instances of FIFO/SERDES 340-b. In some other examples, the FIFO/SERDES 340-b-3 may be operated in accordance with a different index (e.g., a different SERDES index, a different multiplexing index) which may be determined in accordance with a given repair mapping (e.g., determined by the interface block 220-c and signaled to the interface block 260-c via a bus 301). In some other examples, FIFO/SERDES 340-b-3 may be omitted, which may be associated with each position of the portion of the bus 255-b corresponding to the memory array 250-c-3 being mapped with a respective contact 270-e, and available for a given repair configuration (e.g., mapping a repair between a position of the bus 470 and a position of a portion of a bus 255 allocated to repair techniques). These and other examples of repair configuration flexibility may be implemented in other examples for implementing the architecture 400.

By implementing a single repair column of the memory array 250-c-3 for the second example, more columns of the memory array 250-c-3 may remain available for other repairs, compared to techniques that replace mapping for all columns associated with the contacts 230-c-1 and 270-c-1, regardless of whether they are associated with a failure, with a respective repair columns from the memory array 250-c-3.

Figure 9:
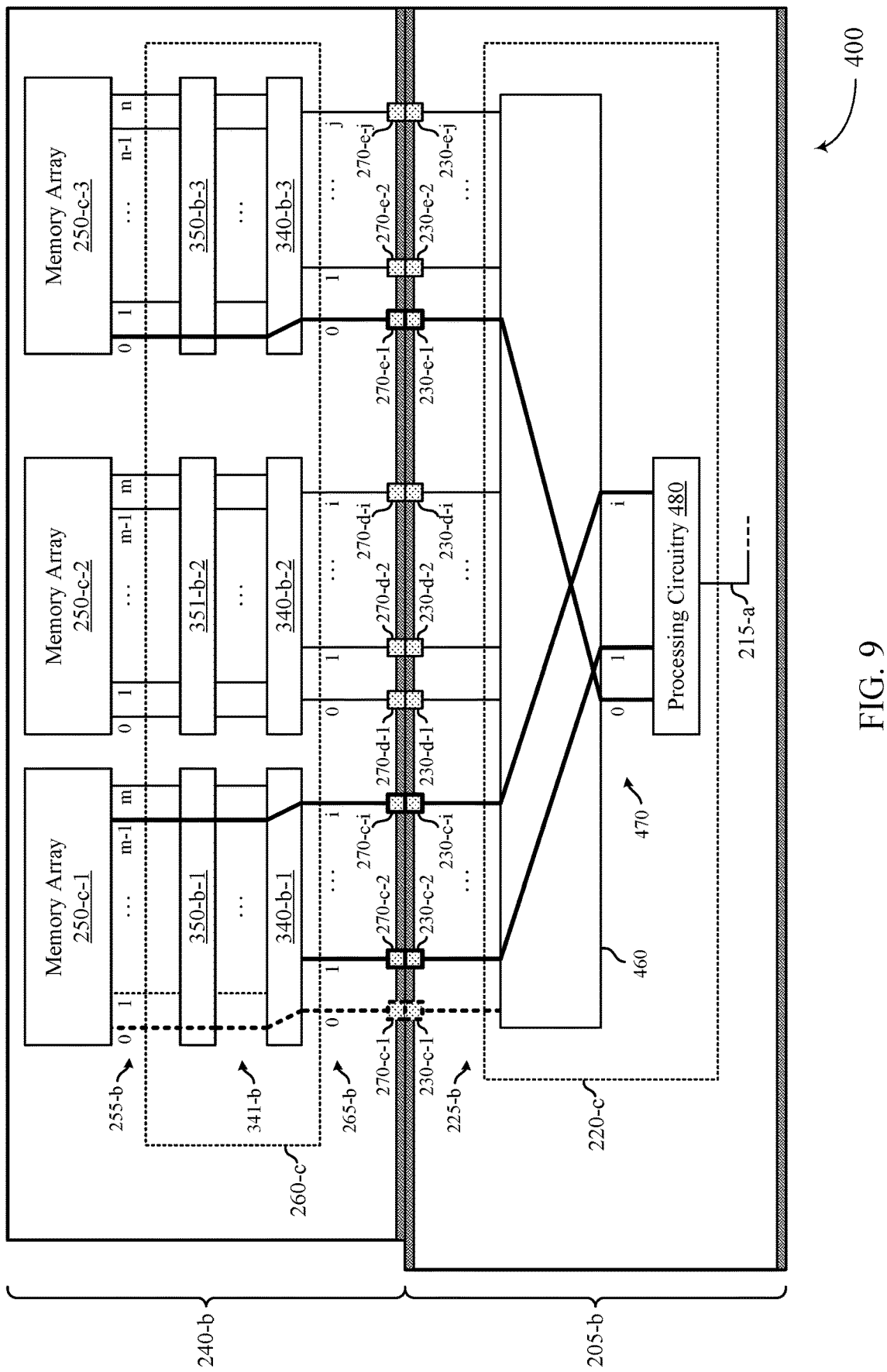
Figure 10:
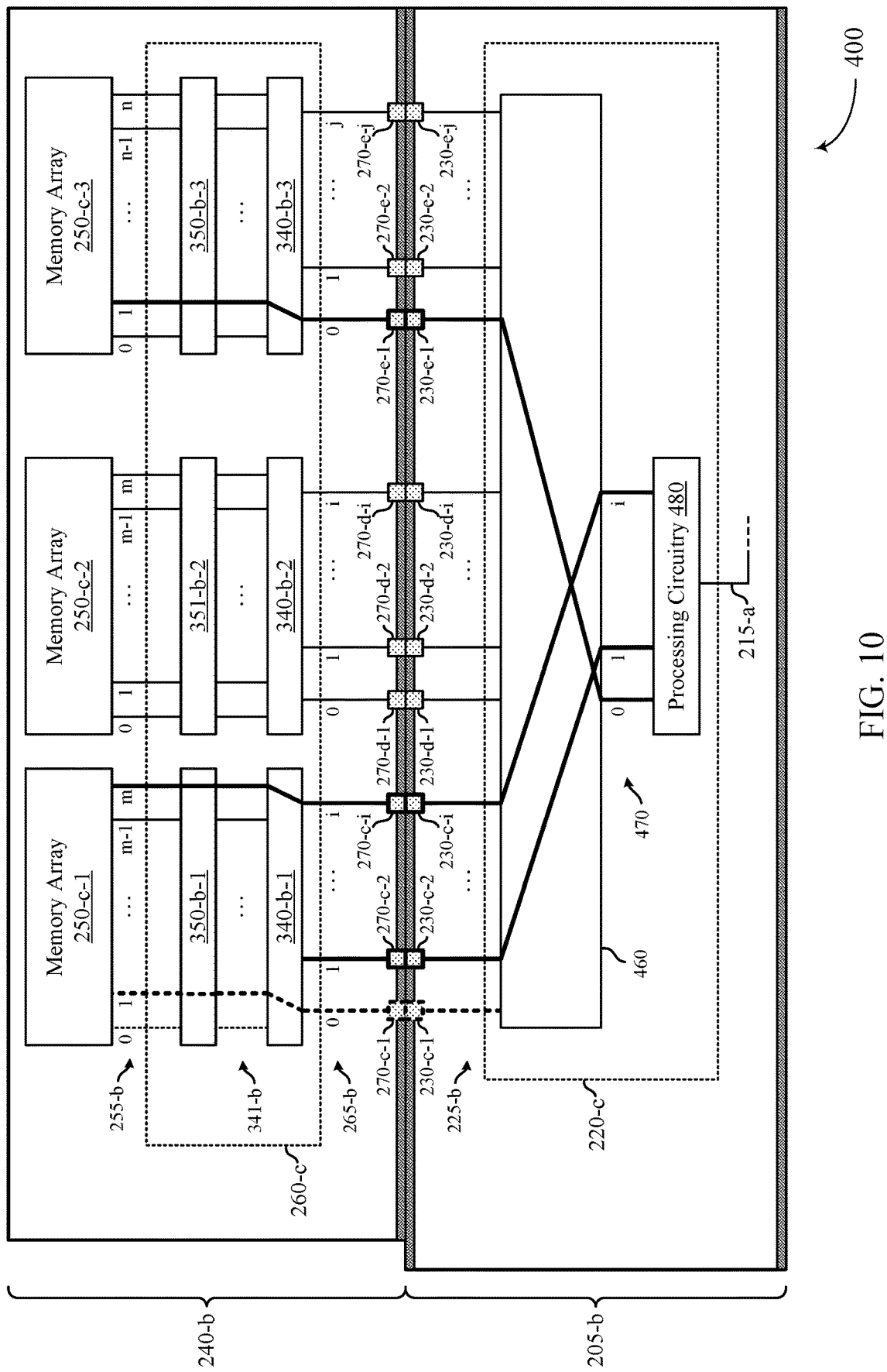

FIGS. 9 and 10 illustrate a third example for implementing the architecture 400. The third example may be implemented for circumstances in which an error condition associated with data signaling via the contacts 230-c-1 and 270-c-1 indicates a presence of an error for all data signaling conditions. For example, FIGS. 9 and 10 may illustrate aspects of the switching circuitry 460 being configured to operate in response to an interconnection failure (e.g., a TSV failure, a failure of an electrical coupling between a contact 230) and a contact 270, or other contacts, a failure of a position of the bus 265-b, a failure of a position of the bus 225-b, or a combination thereof), or a failure of multiple columns, among other examples, which may be referred to as a contact repair technique (e.g., to repair a failure associated with contacts 230-c-1 and 270-c-1)

FIG. 9 illustrates aspects of the third example for accessing the memory array 250-c-1 in accordance with a first SERDES index, for which position 0) of the portion of the bus 341-b corresponding to the memory array 250-c-1 is mapped with position 0 of the bus 265-b, and position m−1 of the portion of the bus 341-b is mapped with position i of the bus 265-b, and so on. Because the error condition in the third example indicates a presence of errors for data signaling via the contact 230-c-1 and the contact 270-c-1 for the first SERDES index (e.g., for a TSV or other circuitry or interconnection associated with the contacts 230-c-1 and 270-c-1, or for multiple columns associated with such a TSV), position 0 of the bus 470 may be mapped with the contact 230-e-1, accessing position 0) of the portion of the bus 265-b corresponding to the memory array 250-c-3 instead of position 0 of the portion of the bus 265-b corresponding to the memory array 250-c-1. For the first SERDES index, position 0) of the portion of the bus 265-*b* corresponding to the memory array 250-*c*-1 may be mapped (e.g., by the FIFO/SERDES 340-*b*-3) to position 0) of the portion of the bus 255-*b* corresponding to the memory array 250-*c*-1 (e.g., for accessing a column of the memory array 250-*c*-3 corresponding to position 0). Because the error condition in the second example indicates an absence of errors for data signaling via other contacts 230-*c* and contacts 270-*c* for the first SERDES index, the switching circuitry 460 may map the other positions of the bus 470 with respective contacts 230-*c*.

FIG. 10 illustrates aspects of the third example for accessing the memory array 250-*c*-1 in accordance with a second SERDES index, for which position 1 of the portion of the bus 341-*b* corresponding to the memory array 250-*c*-1 is mapped with position 0) of the bus 265-*b*, and position m of the portion of the bus 341-*b* is mapped with the position i of the bus 265-*b*, and so on. Because the error condition in the third example also indicates a presence of errors for data signaling via the contact 230-*c*-1 and the contact 270-*c*-1 for the second SERDES index, position 0) of the bus 470 may be mapped (e.g., may remain mapped) with the contact 230-*e*-1, accessing position 0 of the portion of the bus 265-*b* corresponding to the memory array 250-*c*-3 instead of position 0 of the portion of the bus 265-*b* corresponding to the memory array 250-*c*-1. For the second SERDES index, position 0) of the portion of the bus 265-*b* corresponding to the memory array 250-*c*-1 may be mapped (e.g., by the FIFO/SERDES 340-*b*-3) to position 1 of the portion of the bus 255-*b* corresponding to the memory array 250-*c*-1 (e.g., for accessing a column of the memory array 250-*c*-3 corresponding to position 1). Because the error condition in the second example indicates an absence of errors for data signaling via other contacts 230-*c* and contacts 270-*c* for the first SERDES index, the switching circuitry 460 may map the other positions of the bus 470 with respective contacts 230-*c*.

By implementing multiple repair columns of the memory array 250-*c*-3 for the third example, the switching circuitry 460 may be implemented to overcome a failure that affects multiple columns of the array 250-*c*-1, which may be associated with an interconnection failure of or between the die 205-*b* and the die 240-*b*. Thus, in accordance with these and other examples, the switching circuitry 460 may be configured with repair solutions that are based on a granularity or scope of failures, which may improve utilization of resources (e.g., overprovisioning) allocated to repair solutions compared to other repair techniques.

Figure 11:
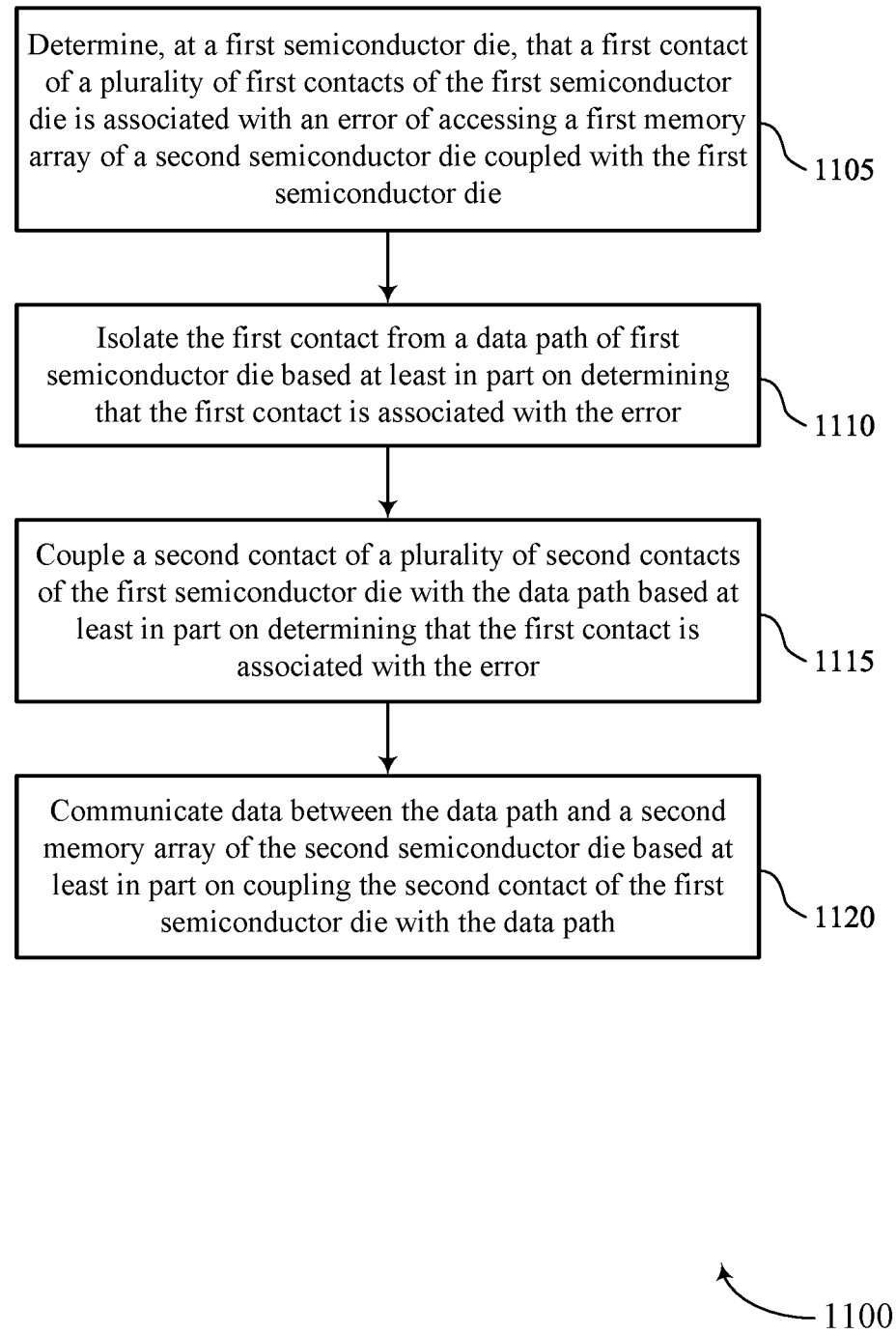
FIG. 11 illustrates a flowchart showing a method or methods that support repair techniques for coupled memory dies in accordance with examples as disclosed herein.

FIG. 11 illustrates a flowchart showing a method 1100 that supports repair techniques for coupled memory dies in accordance with examples as disclosed herein. The operations of method 1100 may be implemented by a semiconductor system or its components as described herein (e.g., with reference to FIGS. 1 through 10). In some examples, a semiconductor system may execute a set of instructions to control the functional elements of the system to perform the described functions. Additionally, or alternatively, a semiconductor system may perform aspects of the described functions using special-purpose circuitry.

At 1105, the method 1100 may include determining, at a first semiconductor die, that a first contact of a plurality of first contacts of the first semiconductor die is associated with an error of accessing a first memory array of a second semiconductor die coupled with the first semiconductor die.

At 1110, the method 1100 may include isolating the first contact from a data path of first semiconductor die based at least in part on determining that the first contact is associated with the error.

At 1115, the method 1100 may include coupling a second contact of a plurality of second contacts of the first semiconductor die with the data path based at least in part on determining that the first contact is associated with the error.

At 1120, the method 1100 may include communicating data between the data path and a second memory array of the second semiconductor die based at least in part on coupling the second contact of the first semiconductor die with the data path.

In some examples, an apparatus as described herein may perform a method or methods, such as the method 1100. The apparatus may include features (e.g., circuitry, logic, one or more controllers, or other means), instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, or instructions, or any combination thereof for determining, at a first semiconductor die, that a first contact of a plurality of first contacts of the first semiconductor is associated with an error of accessing a first memory array of a second semiconductor die coupled with the first semiconductor die: isolating the first contact from a data path of first semiconductor die based at least in part on determining that the first contact is associated with the error: coupling a second contact of a plurality of second contacts of the first semiconductor die with the data path based at least in part on determining that the first contact is associated with the error: and communicating data between the data path and a second memory array of the second semiconductor die based at least in part on coupling the second contact of the first semiconductor die with the data path.

Aspect 2: The method, apparatus, or non-transitory computer-readable medium of aspect 1, further including operations, features, or instructions, or any combination thereof for remapping a bit position of the data path from the first memory array to the second memory array, where communicating the data between the data path and the second memory array includes communicating data of the bit position with the second memory array based at least in part on the remapping.

Aspect 3: The method, apparatus, or non-transitory computer-readable medium of aspect 2, further including operations, features, or instructions, or any combination thereof for communicating data of a second position of the data path with the first memory array concurrently with communicating the data of the bit position with the second memory array based at least in part on coupling another first contact of the plurality of first contacts with the data path.

Aspect 4: The method, apparatus, or non-transitory computer-readable medium of any of aspects 1 through 3, further including operations, features, or instructions, or any combination thereof for determining that the error is associated with a fault along a signal path that includes the first contact, where isolating the first contact from the data path and coupling the second contact with the data path is based at least in part on a remapping of a plurality of first columns of memory cells of the first memory array to a plurality of second columns of memory cells of the second memory array that avoids access of the first memory array via the signal path.

Aspect 5: The method, apparatus, or non-transitory computer-readable medium of any of aspects 1 through 4, further including operations, features, or instructions, or any combination thereof for determining that the error is associated with a first column of memory cells of the first memory array, where isolating the first contact from the data path and coupling the second contact with the data path is based at least in part on a remapping of the first column of memory cells to a second column of memory cells of the second memory array that avoids access of the first column of memory cells.

Aspect 6: The method, apparatus, or non-transitory computer-readable medium of aspect 5, further including operations, features, or instructions, or any combination thereof for determining to access a third column of memory cells of the first memory array that is not associated with an error: coupling the first contact with the data path based at least in part on determining to access the third column of memory cells: isolating the second contact from the data path based at least in part on determining to access the third column of memory cells; and communicating second data between the data path and the third column of memory cells based at least in part on coupling the first contact of the first semiconductor die with the data path.

Aspect 7: The method, apparatus, or non-transitory computer-readable medium of any of aspects 1 through 6, further including operations, features, or instructions, or any combination thereof for determining that the error is associated with a plurality of first columns of memory cells of the first memory array, where isolating the first contact from the data path and coupling the second contact with the data path is based at least in part on a remapping of the plurality of first columns of memory cells to a plurality of second columns of memory cells of the second memory array that avoids access of the plurality of first columns of memory cells.

Aspect 8: The method, apparatus, or non-transitory computer-readable medium of aspect 7, further including operations, features, or instructions, or any combination thereof for determining that the error is associated with a serialization/deserialization corresponding to the plurality of first columns of memory cells.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 9: An apparatus, including a first semiconductor die and a second semiconductor die coupled with the first semiconductor die. The first semiconductor die including: a first memory array including a plurality of first memory cells: a plurality of first contacts each associated with data signaling for a respective subset of first memory cells of the plurality of first memory cells: a second memory array including a plurality of second memory cells: and a plurality of second contacts each associated with data signaling for a respective subset of second memory cells of the plurality of second memory cells. The second semiconductor die including: a plurality of third contacts each corresponding to a respective first contact of the plurality of first contacts: a plurality of fourth contacts each corresponding to a respective second contact of the plurality of second contacts: and circuitry coupled with the plurality of third contacts and the plurality of fourth contacts, and configured to couple a data path with a third contact of the plurality of third contacts or a fourth contact of the plurality of fourth contacts based at least in part on an error condition of the data signaling associated with a first contact of the plurality of first contacts corresponding to a third contact of the plurality of third contacts.

Aspect 10: The apparatus of aspect 9, where the circuitry is configured to couple the data path with the third contact and isolate the data path from the plurality of fourth contacts based at least in part on the error condition indicating an absence of errors for the data signaling associated with the first contact corresponding to the third contact.

Aspect 11: The apparatus of any of aspects 9 through 10, where the circuitry is configured to: couple the data path with the third contact and isolate the data path from the plurality of fourth contacts based at least in part on the error condition indicating an absence of an error for a first subset of the data signaling associated with the first contact corresponding to the third contact: and couple the data path with the fourth contact and isolate the data path from the third contact based at least in part on the error condition indicating a presence of an error for a second subset of the data signaling associated with the first contact corresponding to the third contact.

Aspect 12: The apparatus of aspect 11, where: the error condition indicates the absence of an error for a first column of a subset of first memory cells respective to the first contact corresponding to the third contact: and the error condition indicates the presence of an error for a second column of the subset of first memory cells respective to the first contact corresponding to the third contact.

Aspect 13: The apparatus of any of aspects 9 through 12, where the circuitry is configured to: couple the data path with the fourth contact and isolate the data path from the third contact based at least in part on the error condition indicating a presence of an error with a first subset of the data signaling associated with the first contact corresponding to the third contact: and couple the data path with another fourth contact of the plurality of fourth contacts and isolate the data path from the third contact based at least in part on the error condition indicating a presence of an error with a second subset of the data signaling associated with the first contact.

Aspect 14: The apparatus of aspect 13, where the error condition indicates an error along a signal path that includes the third contact and the first contact corresponding to the third contact.

Aspect 15: The apparatus of any of aspects 9 through 14, where the circuitry is configured to: determine the error condition of the data signaling based at least in part on error condition information stored at the second semiconductor die.

Aspect 16: The apparatus of any of aspects 9 through 15, where the circuitry is configured to: initiate a determination of the error condition of the data signaling.

An apparatus is described. The following provides an overview of aspects of the apparatus as described herein:

Aspect 17: An apparatus including: a first semiconductor die including: a first contact configured to couple with a second semiconductor die and to communicate data signaling associated with a first memory array of the second semiconductor die: a second contact configured to couple with the second semiconductor die and to communicate data signaling associated with a second memory array of the second semiconductor die: and circuitry coupled with the first contact and the second contact and configured to: isolate the first contact from a data path of the first semiconductor die based at least in part on the first contact being associated with an error of accessing the first memory array: couple the second contact with the data path based at least in part on the first contact being associated with the error of accessing the first memory array: and communicate data between the data path and the second contact based at least in part on coupling the second contact with the data path.

Aspect 18: The apparatus of aspect 17, where the circuitry is configured to: remap a bit position of the data path from the first contact to the second contact, where communicating the data between the data path and the second contact includes communicating data of the bit position based at least in part on the remapping.

Aspect 19: The apparatus of any of aspects 17 through 18, where the circuitry is configured to: determine that the error is associated with a fault along a signal path that includes the first contact, where the circuitry is configured to isolate the first contact from the data path and couple the second contact with the data path based at least in part on a remapping of a plurality of first columns of memory cells of the first memory array to a plurality of second columns of memory cells of the second memory array that avoids access of the first memory array via the signal path.

Aspect 20: The apparatus of any of aspects 17 through 19, where the circuitry is configured to: determine that the error is associated with a first column of memory cells of the first memory array, where the circuitry is configured to isolate the first contact from the data path and couple the second contact with the data path based at least in part on a remapping of the first column of memory cells to a second column of memory cells of the second memory array that avoids access of the first column of memory cells.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact." "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow:

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. An apparatus, comprising:
   a first semiconductor die, comprising:
      a first memory array comprising a plurality of first memory cells;

a plurality of first contacts each associated with data signaling for a respective subset of first memory cells of the plurality of first memory cells;

a second memory array comprising a plurality of second memory cells; and a plurality of second contacts each associated with data signaling for a respective subset of second memory cells of the plurality of second memory cells; and a second semiconductor die coupled with the first semiconductor die, comprising:

a plurality of third contacts each corresponding to a respective first contact of the plurality of first contacts;

a plurality of fourth contacts each corresponding to a respective second contact of the plurality of second contacts; and circuitry coupled with the plurality of third contacts and the plurality of fourth contacts, and configured to couple a data path with a third contact of the plurality of third contacts or a fourth contact of the plurality of fourth contacts based at least in part on an error condition of the data signaling associated with a first contact of the plurality of first contacts corresponding to a third contact of the plurality of third contacts.

2. The apparatus of claim 1, wherein the circuitry is configured to couple the data path with the third contact and isolate the data path from the plurality of fourth contacts based at least in part on the error condition indicating an absence of errors for the data signaling associated with the first contact corresponding to the third contact.

3. The apparatus of claim 1, wherein the circuitry is configured to:

couple the data path with the third contact and isolate the data path from the plurality of fourth contacts based at least in part on the error condition indicating an absence of an error for a first subset of the data signaling associated with the first contact corresponding to the third contact; and couple the data path with the fourth contact and isolate the data path from the third contact based at least in part on the error condition indicating a presence of an error for a second subset of the data signaling associated with the first contact corresponding to the third contact.

4. The apparatus of claim 3, wherein:

the error condition indicates the absence of an error for a first column of a subset of first memory cells respective to the first contact corresponding to the third contact; and the error condition indicates the presence of an error for a second column of the subset of first memory cells respective to the first contact corresponding to the third contact.

5. The apparatus of claim 1, wherein the circuitry is configured to:

couple the data path with the fourth contact and isolate the data path from the third contact based at least in part on the error condition indicating a presence of an error with a first subset of the data signaling associated with the first contact corresponding to the third contact; and couple the data path with another fourth contact of the plurality of fourth contacts and isolate the data path from the third contact based at least in part on the error condition indicating a presence of an error with a second subset of the data signaling associated with the first contact.

6. The apparatus of claim 5, wherein the error condition indicates an error along a signal path that includes the third contact and the first contact corresponding to the third contact.

7. The apparatus of claim 1, wherein the circuitry is configured to:

determine the error condition of the data signaling based at least in part on error condition information stored at the second semiconductor die.

8. The apparatus of claim 1, wherein the circuitry is configured to:

initiate a determination of the error condition of the data signaling.

9. A method, comprising:

determining, at a first semiconductor die, that a first contact of a plurality of first contacts of the first semiconductor die is associated with an error of accessing a first memory array of a second semiconductor die coupled with the first semiconductor die;

isolating the first contact from a data path of first semiconductor die based at least in part on determining that the first contact is associated with the error;

coupling a second contact of a plurality of second contacts of the first semiconductor die with the data path based at least in part on determining that the first contact is associated with the error; and communicating data between the data path and a second memory array of the second semiconductor die based at least in part on coupling the second contact of the first semiconductor die with the data path.

10. The method of claim 9, further comprising:

remapping a bit position of the data path from the first memory array to the second memory array, wherein communicating the data between the data path and the second memory array comprises communicating data of the bit position with the second memory array based at least in part on the remapping.

11. The method of claim 10, further comprising:

communicating data of a second position of the data path with the first memory array concurrently with communicating the data of the bit position with the second memory array based at least in part on coupling another first contact of the plurality of first contacts with the data path.

12. The method of claim 9, further comprising:

determining that the error is associated with a fault along a signal path that includes the first contact, wherein isolating the first contact from the data path and coupling the second contact with the data path is based at least in part on a remapping of a plurality of first columns of memory cells of the first memory array to a plurality of second columns of memory cells of the second memory array that avoids access of the first memory array via the signal path.

13. The method of claim 9, further comprising:

determining that the error is associated with a first column of memory cells of the first memory array, wherein isolating the first contact from the data path and coupling the second contact with the data path is based at least in part on a remapping of the first column of memory cells to a second column of memory cells of the second memory array that avoids access of the first column of memory cells.

14. The method of claim 13, further comprising:

determining to access a third column of memory cells of the first memory array that is not associated with an error;

coupling the first contact with the data path based at least in part on determining to access the third column of memory cells;
isolating the second contact from the data path based at least in part on determining to access the third column of memory cells; and
communicating second data between the data path and the third column of memory cells based at least in part on coupling the first contact of the first semiconductor die with the data path.

15. The method of claim 9, further comprising:
determining that the error is associated with a plurality of first columns of memory cells of the first memory array, wherein isolating the first contact from the data path and coupling the second contact with the data path is based at least in part on a remapping of the plurality of first columns of memory cells to a plurality of second columns of memory cells of the second memory array that avoids access of the plurality of first columns of memory cells.

16. The method of claim 15, further comprising:
determining that the error is associated with a serialization/deserialization corresponding to the plurality of first columns of memory cells.

17. An apparatus comprising:
a first semiconductor die comprising:
 a first contact configured to couple with a second semiconductor die and to communicate data signaling associated with a first memory array of the second semiconductor die;
 a second contact configured to couple with the second semiconductor die and to communicate data signaling associated with a second memory array of the second semiconductor die; and
 circuitry coupled with the first contact and the second contact and configured to:
  isolate the first contact from a data path of the first semiconductor die based at least in part on the first contact being associated with an error of accessing the first memory array;
  couple the second contact with the data path based at least in part on the first contact being associated with the error of accessing the first memory array; and
  communicate data between the data path and the second contact based at least in part on coupling the second contact with the data path.

18. The apparatus of claim 17, wherein the circuitry is configured to:
remap a bit position of the data path from the first contact to the second contact, wherein communicating the data between the data path and the second contact comprises communicating data of the bit position based at least in part on the remapping.

19. The apparatus of claim 17, wherein the circuitry is configured to:
determine that the error is associated with a fault along a signal path that includes the first contact, wherein the circuitry is configured to isolate the first contact from the data path and couple the second contact with the data path based at least in part on a remapping of a plurality of first columns of memory cells of the first memory array to a plurality of second columns of memory cells of the second memory array that avoids access of the first memory array via the signal path.

20. The apparatus of claim 17, wherein the circuitry is configured to:
determine that the error is associated with a first column of memory cells of the first memory array, wherein circuitry is configured to isolate the first contact from the data path and couple the second contact with the data path based at least in part on a remapping of the first column of memory cells to a second column of memory cells of the second memory array that avoids access of the first column of memory cells.

* * * * *